(12) United States Patent
McInnis et al.

(10) Patent No.: US 10,309,144 B2
(45) Date of Patent: Jun. 4, 2019

(54) VENT OPERATOR

(71) Applicant: Caldwell Manufacturing Company North America, LLC, Rochester, NY (US)

(72) Inventors: James McInnis, Hilton, NY (US); Malcolm Muir, Honeoye Falls, NY (US); Brandan Cruz, Phoenix, AZ (US)

(73) Assignee: Caldwell Manufacturing Company North America, LLC, Rochester, NY (US)

( * ) Notice: Subject to any disclaimer, the term of this patent is extended or adjusted under 35 U.S.C. 154(b) by 221 days.

(21) Appl. No.: 15/508,273

(22) PCT Filed: Sep. 8, 2015

(86) PCT No.: PCT/US2015/048962
§ 371 (c)(1),
(2) Date: Mar. 2, 2017

(87) PCT Pub. No.: WO2016/037186
PCT Pub. Date: Mar. 10, 2016

(65) Prior Publication Data
US 2017/0306682 A1 Oct. 26, 2017

Related U.S. Application Data

(60) Provisional application No. 62/046,617, filed on Sep. 5, 2014.

(51) Int. Cl.
*E05F 15/00* (2015.01)
*E05F 15/622* (2015.01)
(Continued)

(52) U.S. Cl.
CPC ............ *E05F 15/622* (2015.01); *E05F 11/10* (2013.01); *E05F 11/26* (2013.01); *E05F 15/63* (2015.01);
(Continued)

(58) Field of Classification Search
CPC . E05F 11/26; E05F 11/10; E05F 15/63; E05F 11/16; E05F 15/619; F16H 21/44;
(Continued)

(56) References Cited

U.S. PATENT DOCUMENTS 4,253,276 A * 3/1981 Peterson ................ E05D 15/28
49/249
4,497,135 A 2/1985 Vetter
(Continued)

FOREIGN PATENT DOCUMENTS

DE 102004044416 A1 3/2006
DE 102008032750 A1 1/2010
(Continued)

OTHER PUBLICATIONS

International Search Report for PCT/US2015/048962, ISA/US, Alexandria, Virginia, dated Feb. 5, 2016.
(Continued)

*Primary Examiner* — Chi Q Nguyen
(74) *Attorney, Agent, or Firm* — Harness, Dickey & Pierce, P.L.C.

(57) ABSTRACT

An operator assembly may move a window vent relative to a frame. The operator assembly includes a stationary member, an arm and a drive member. The arm is mounted for rotation relative to the stationary member between an open position and a closed position. The drive member is received in a channel defined by the stationary member for linear motion therein relative to the stationary member and the arm among a first position in which the drive member engages a
(Continued)

locking feature of the window vent, a second position in which the drive member is spaced apart from and disengaged from the locking feature without rotating the arm out of the closed position, and a third position in which the drive member is further spaced apart from the locking feature. Movement of the drive member between the second and third positions moves the arm between the closed and open positions.

19 Claims, 18 Drawing Sheets

(51) Int. Cl.
| | | |
|---|---|---|
| *E05F 11/10* | (2006.01) | |
| *E05F 11/26* | (2006.01) | |
| *F16H 19/04* | (2006.01) | |
| *F16H 21/44* | (2006.01) | |
| *F16H 37/12* | (2006.01) | |
| *E05F 15/63* | (2015.01) | |

(52) U.S. Cl.
CPC ............. *F16H 19/04* (2013.01); *F16H 21/44* (2013.01); *F16H 37/12* (2013.01); *E05Y 2900/148* (2013.01); *F16H 2019/046* (2013.01)

(58) Field of Classification Search
CPC .... F16H 37/12; F16H 19/02; F16H 2019/046; E05C 9/063; E05C 17/24; E05C 9/24; E05D 15/524; E05Y 2900/148; E05Y 2201/716
USPC ......... 49/279, 336, 353, 192, 193, 395, 394, 49/342; 74/396, 400
See application file for complete search history.

(56) References Cited

U.S. PATENT DOCUMENTS

| | | | |
|---|---|---|---|
| 4,887,392 A | 12/1989 | Lense | |
| 4,942,694 A * | 7/1990 | Simoncelli | E05D 15/5211 49/192 |
| 5,406,751 A | 4/1995 | Hansen et al. | |
| 6,044,587 A * | 4/2000 | Vetter | E05F 11/24 49/324 |
| 6,122,863 A * | 9/2000 | Tippin | E05F 11/16 49/279 |
| 6,789,443 B1 | 9/2004 | Torii et al. | |
| 6,915,608 B2 * | 7/2005 | Labarre | E05F 15/63 49/140 |
| 7,100,327 B2 * | 9/2006 | Rangabasyam | E05C 9/02 292/161 |
| 7,464,619 B2 * | 12/2008 | Vetter | E05F 11/16 384/125 |
| 8,528,255 B2 * | 9/2013 | Lambertini | E05C 9/063 49/192 |
| 8,683,746 B2 | 4/2014 | Lambertini | |
| 9,273,763 B2 * | 3/2016 | Evensen | F16H 21/44 |
| 2001/0019211 A1 | 9/2001 | Tremblay et al. | |
| 2002/0078630 A1 * | 6/2002 | Lee | E05F 11/16 49/342 |
| 2005/0055804 A1 * | 3/2005 | Liang | E05D 7/0415 16/235 |
| 2012/0174487 A1 * | 7/2012 | Lambertini | E05F 11/10 49/353 |
| 2012/0180392 A1 | 7/2012 | Lambertini | |
| 2017/0002594 A1 * | 1/2017 | Carrier | E05F 11/16 |

FOREIGN PATENT DOCUMENTS

| | | |
|---|---|---|
| EP | 1312742 A2 | 5/2003 |
| GB | 2462687 A | 2/2010 |

OTHER PUBLICATIONS

Written Opinion of the ISA for PCT/US2015/048962, ISA/US, Alexandria, Virginia, dated Feb. 5, 2016.
Corrected IPRP with annexes for PCT/US2015/048962, mailed Sep. 4, 2016.
Extended European Search Report for EP 15838291.1, dated Apr. 12, 2018, EPO.

* cited by examiner

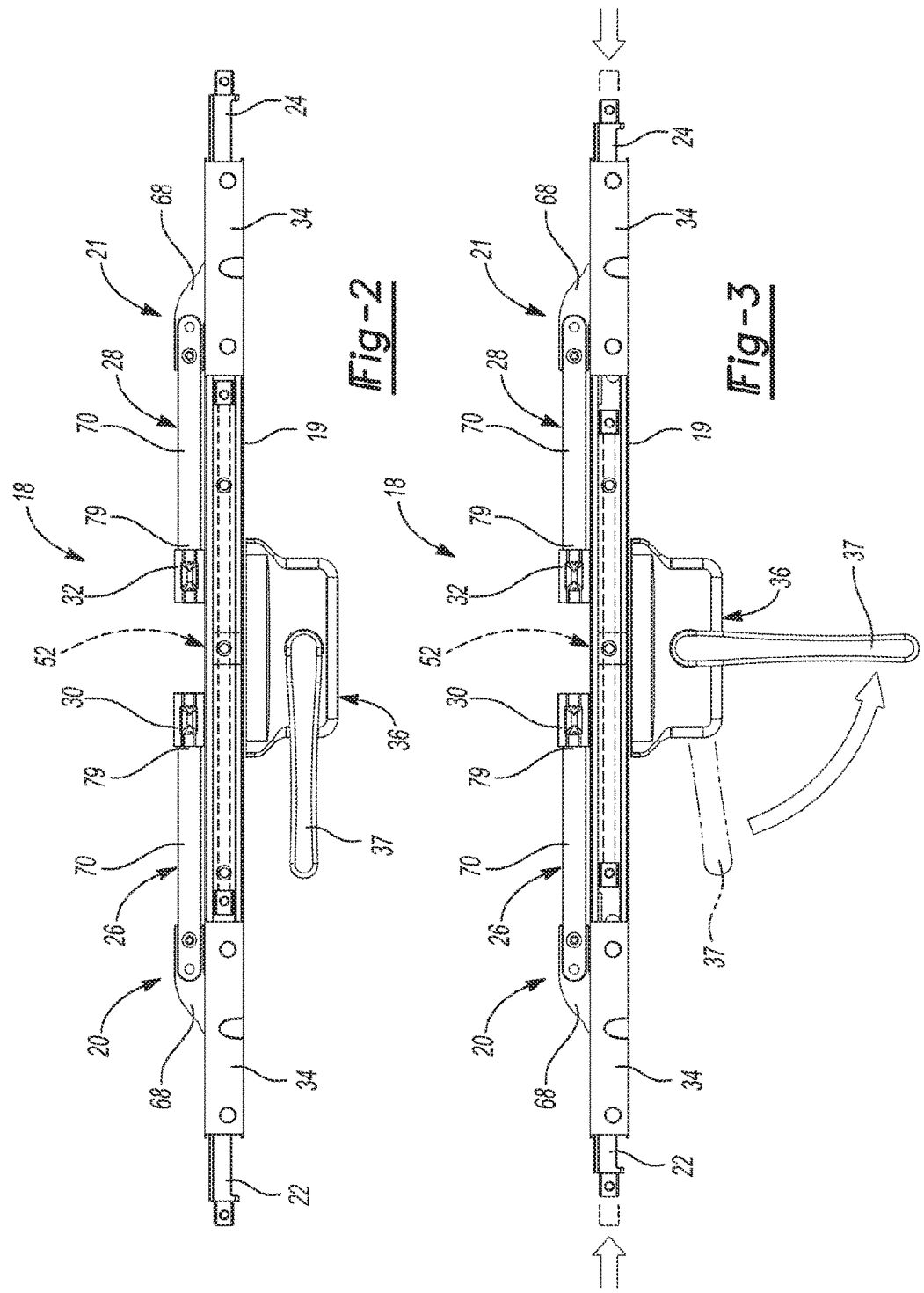

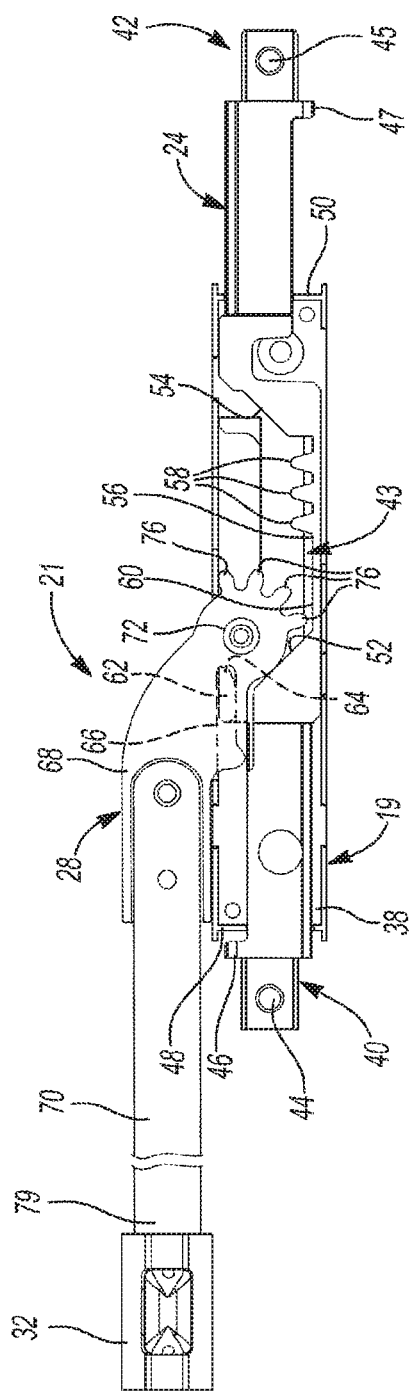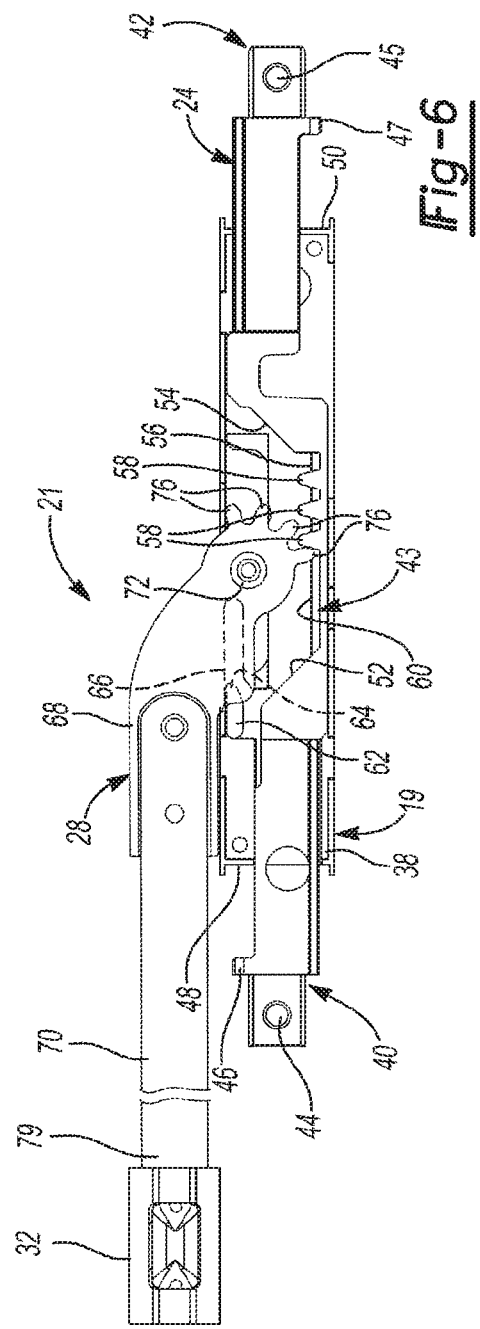

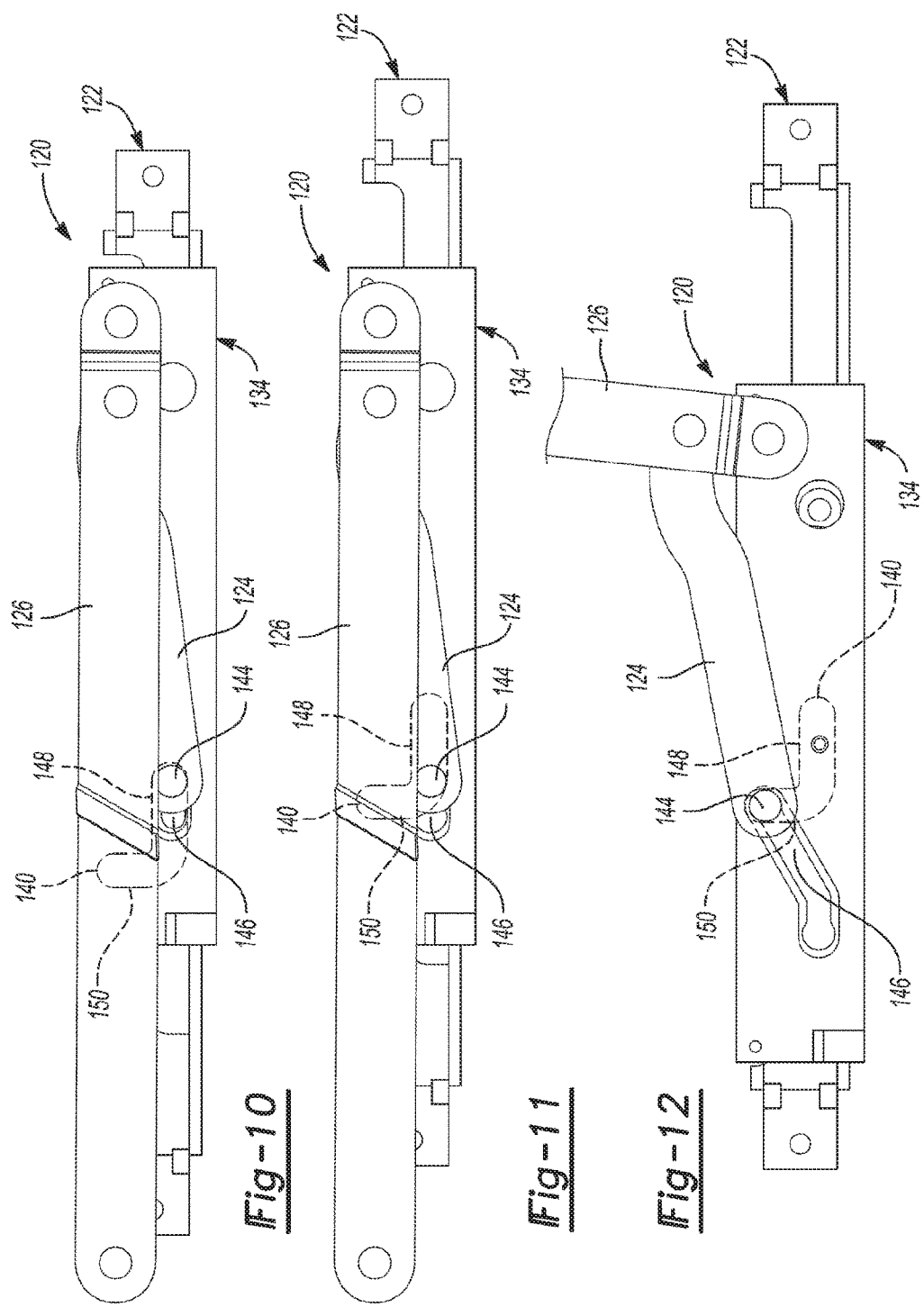

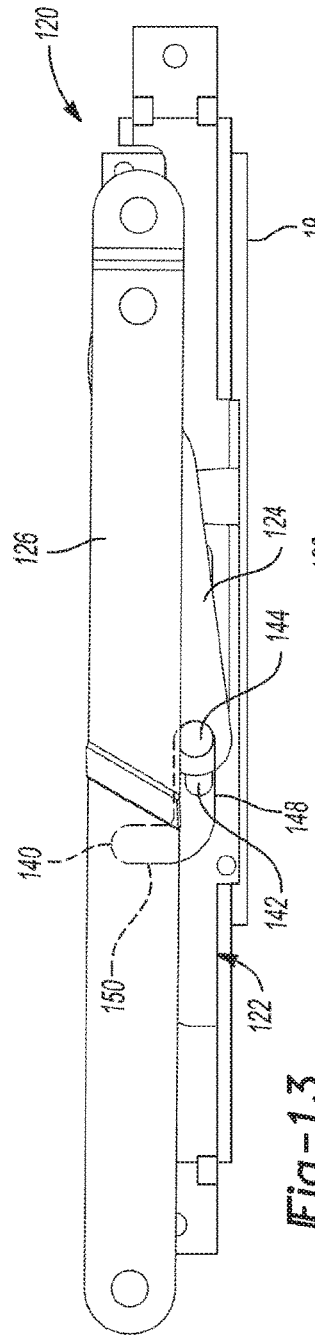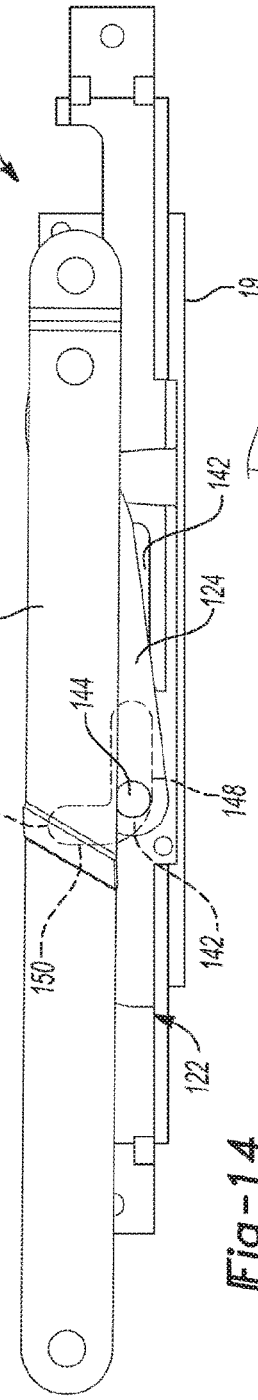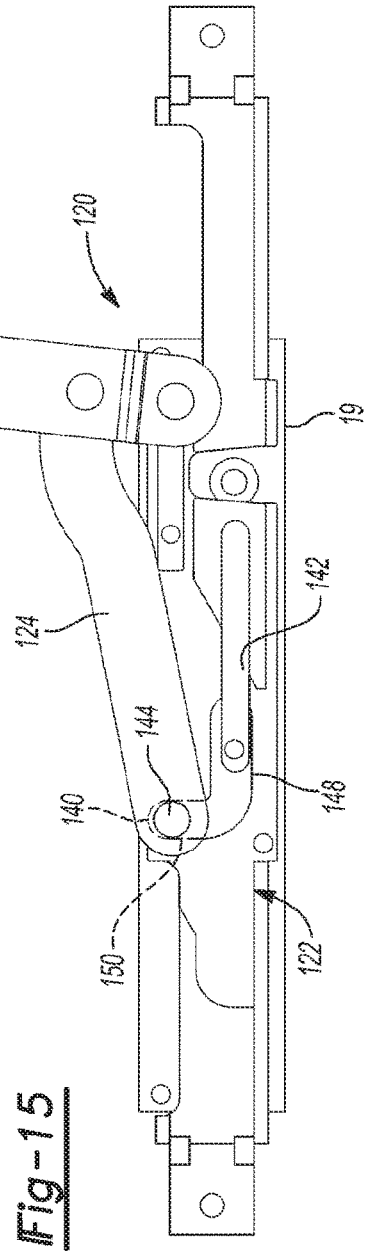

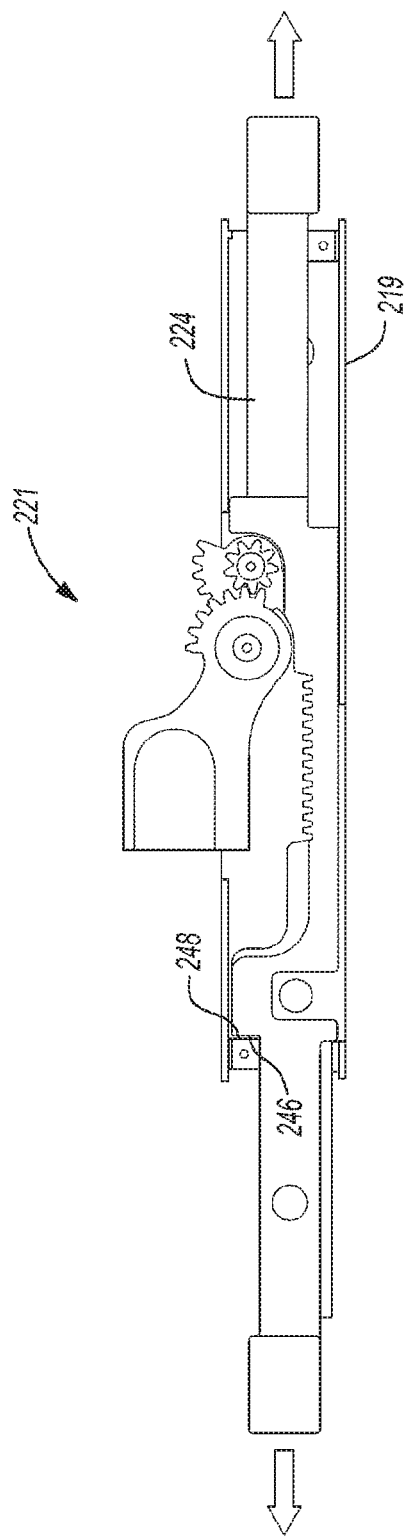
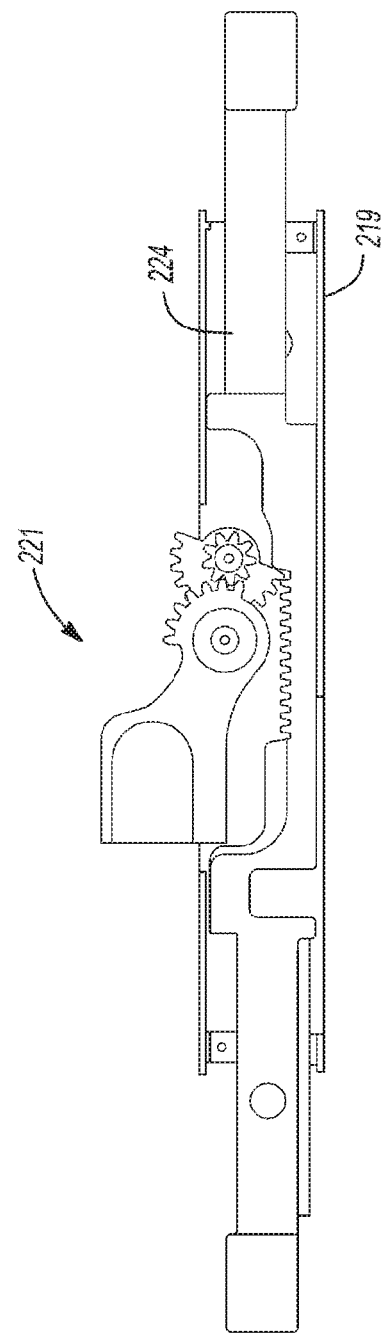

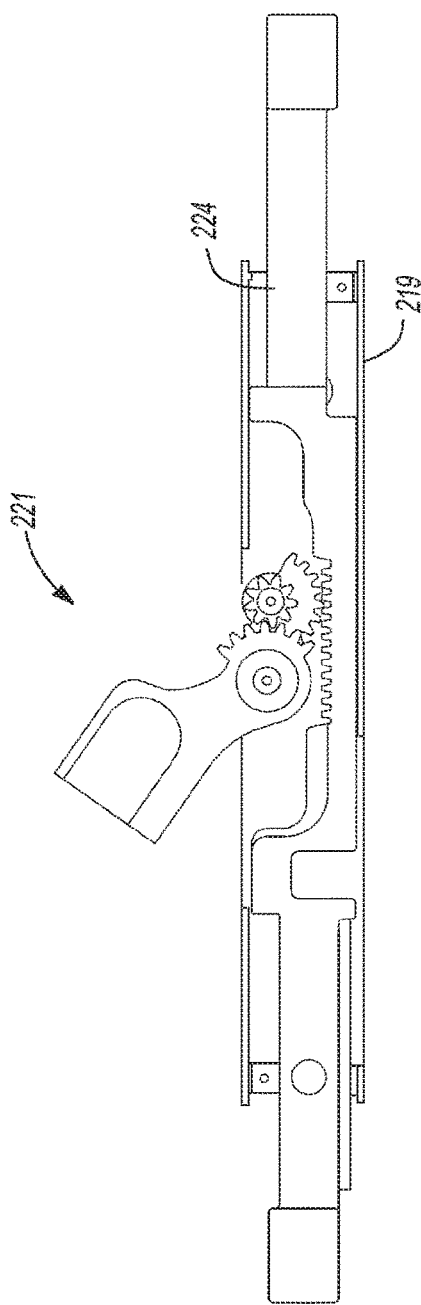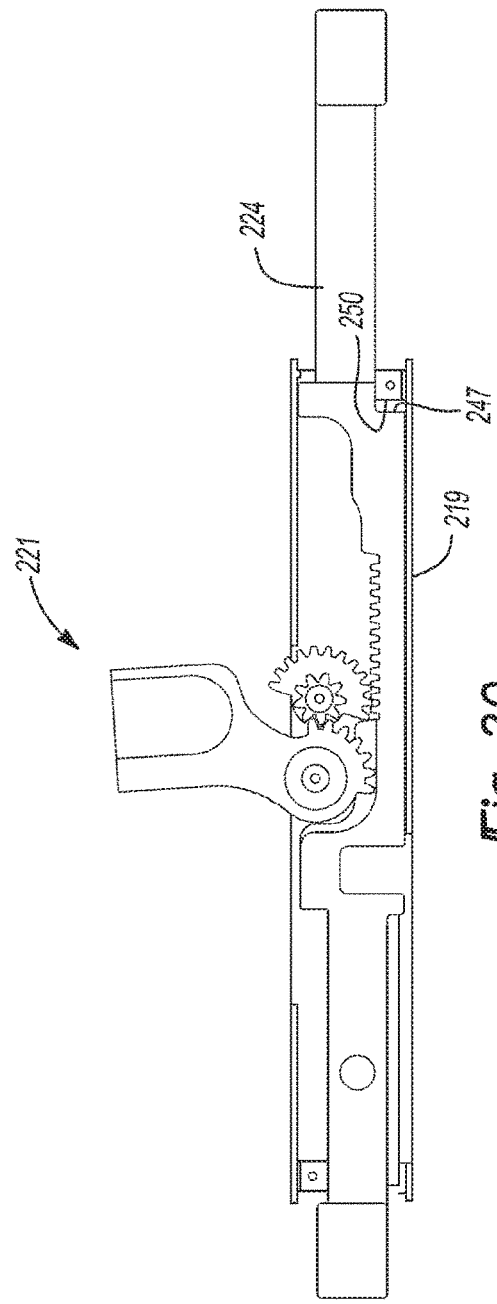

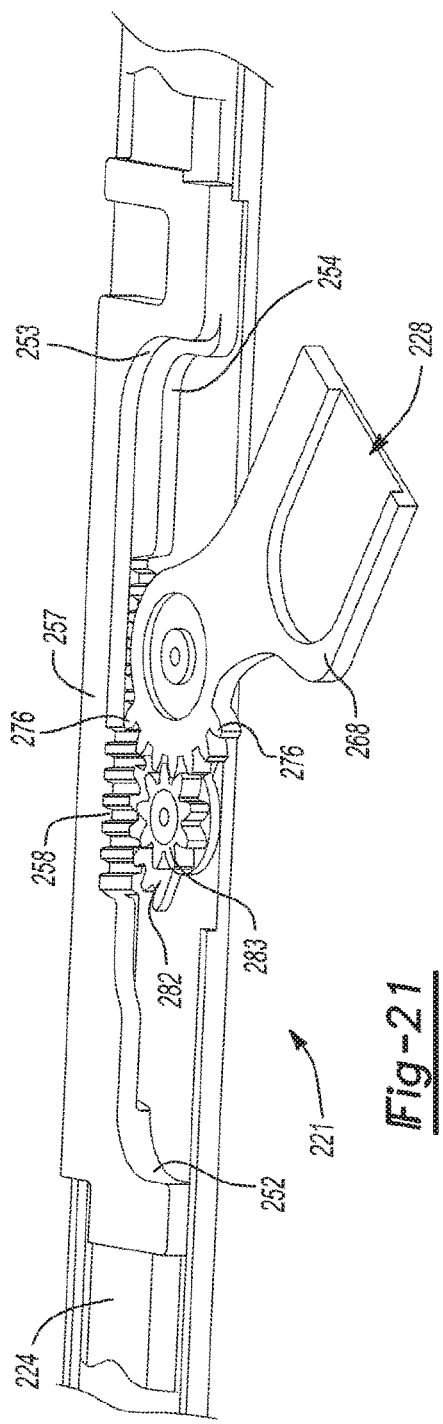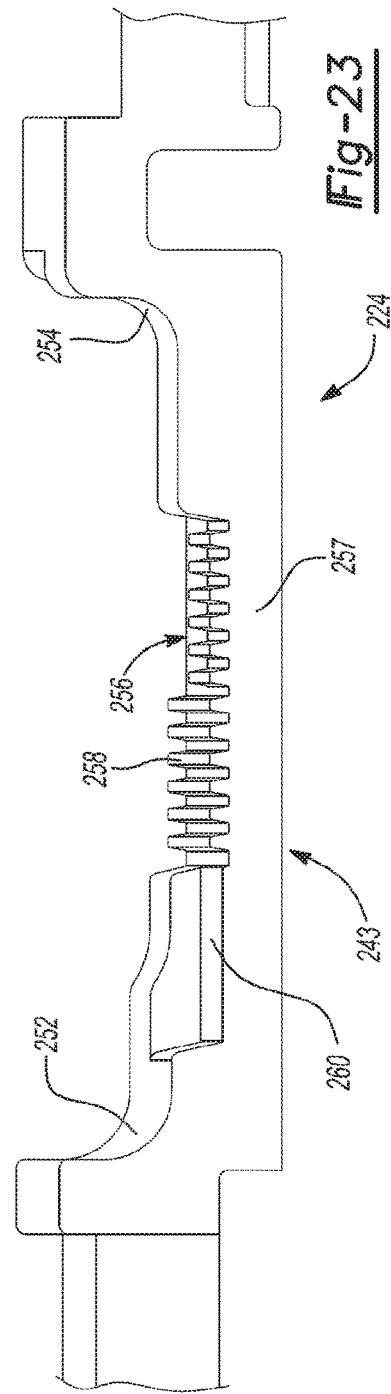

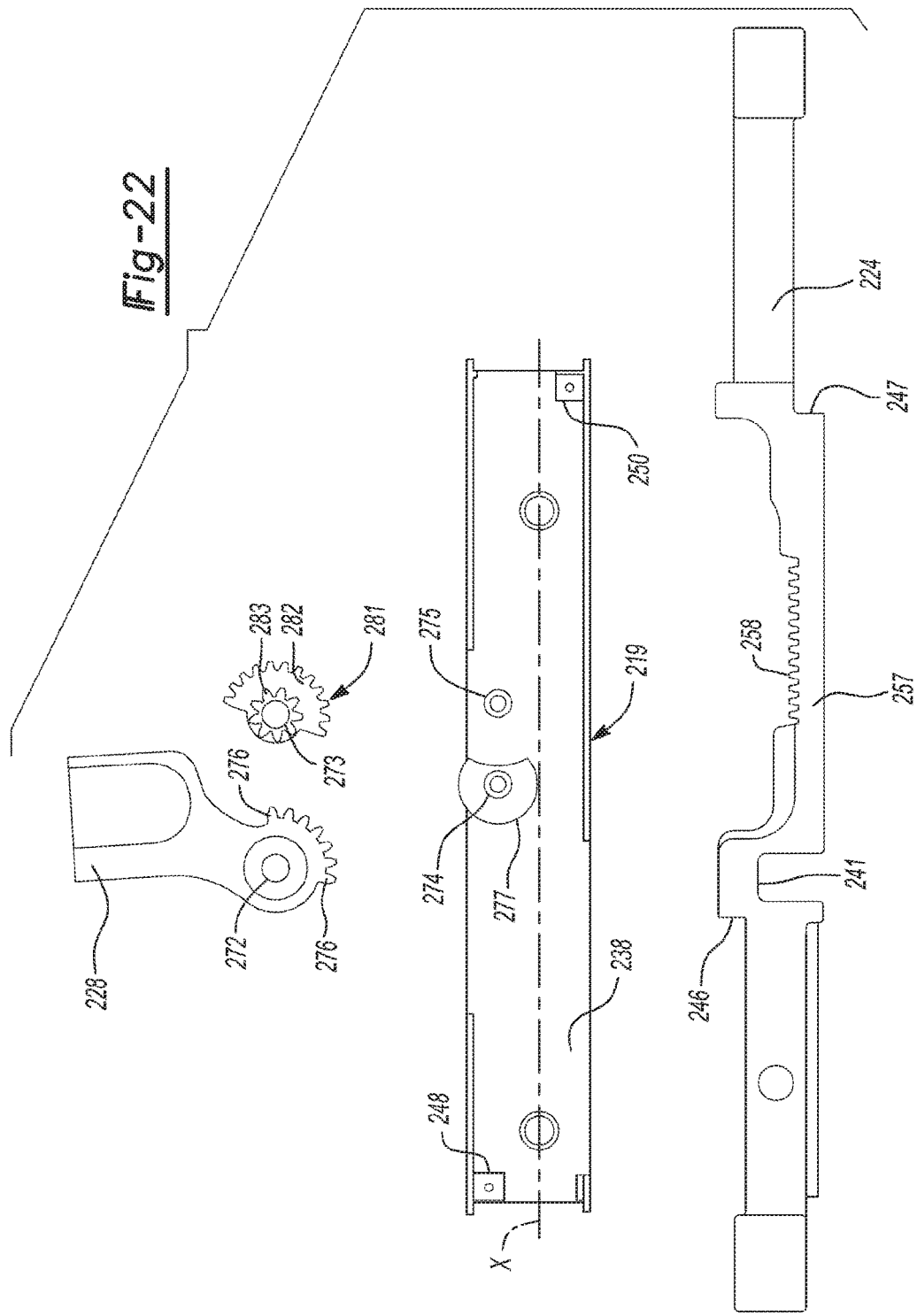

VENT OPERATOR

CROSS-REFERENCE TO RELATED APPLICATION

This application is a 371 National Phase of PCT/US2015/048962, published in English as WO 2016/037186 on Mar. 10, 2016, which claims the benefit of U.S. Provisional Application No. 62/046,617, filed on Sep. 5, 2014. The entire disclosure of the above application is incorporated herein by reference.

FIELD

The present disclosure relates to an operator assembly for a vent window.

BACKGROUND

This section provides background information related to the present disclosure and is not necessarily prior art.

Vent operator assemblies may be employed in casement-type or projection-type window assemblies, for example, to move a window vent between open and closed positions relative to a window frame. The vent operator assemblies may also lock and unlock the window vent relative to the window frame. In projection-type window assemblies, first and second hinge assemblies may be disposed on respective first and second vertically extending sides of the window vent, and the operator assembly may be disposed on a horizontally extending side of the window vent. In casement-type window assemblies, first and second hinge assemblies may be disposed on respective upper and lower horizontally extending sides of the window vent, and the operator assembly may be disposed on a vertically extending side of the window vent.

SUMMARY

This section provides a general summary of the disclosure, and is not a comprehensive disclosure of its full scope or all of its features.

The present disclosure provides an operator assembly that can move a window vent relative to a window frame. The operator assembly can include a base, a drive assembly, and an actuator.

In one form, the operator assembly can include a stationary member, an arm and a drive member. The stationary member may be adapted to be fixed to the window vent. The stationary member may at least partially define a channel. The arm may be mounted for rotation relative to the stationary member between an open position and a closed position. The drive member may be received in the channel for linear motion therein relative to the stationary member and the arm among a first position in which the drive member engages a locking feature of the window vent with the arm in the closed position, a second position in which the drive member is spaced apart from and disengaged from the locking feature without rotating the arm out of the closed position, and a third position in which the drive member is further spaced apart from the locking feature. Movement of the drive member from the second position to the third position may move the arm from the closed position to the open position.

In some embodiments, the operator assembly includes an actuator assembly having a handle. Rotation of the handle between first and second rotational positions causes corresponding movement of the drive member between the first and second positions. Rotation of the handle between the second rotation position and a third rotational position causes corresponding movement of the drive member between the second and third positions.

In some embodiments, the first and third rotational positions may be about one-hundred-eighty degrees apart. In some embodiments, the second rotational position may be about ninety degrees apart from the first and third rotational portions.

In some embodiments, the drive member includes a tab that is received within a slot in the arm when the drive member is in the first position to restrict rotation of the arm toward the open position.

In some embodiments, the tab is at least partially removed from the slot in the second position.

In some embodiments, the drive member includes a plurality of first teeth that drivingly engage a plurality of second teeth extending from the arm to drive the arm between the open and closed positions.

In some embodiments, the plurality of first teeth are shaped substantially identically to each other and are arranged in a linear pattern, and wherein the plurality of second teeth are shaped substantially identically to each other and are arranged in a curved pattern extending about a rotational axis of the arm.

In some embodiments, the drive member includes a first slot having a horizontally extending portion and a vertically extending portion that are angled relative to each other, and wherein the arm includes a peg that is slidably received in the first slot.

In some embodiments, the stationary member includes an inclined second slot that is angled relative to the horizontally extending portion and the vertically extending portion of the first slot, and wherein the peg is slidably received within the second slot.

In some embodiments, movement of the drive member between the second and third positions causes the peg to move along the vertically extending portion of the first slot and along the inclined second slot, thereby causing the arm to rotate between the open and closed positions.

In some embodiments, the drive assembly includes a torque-amplifying gear set that can reduce the force needed to operate the operator assembly and/or increase the operating capacity for the operator assembly, e.g., by allowing for larger and/or heavier window vents to be serviced. Thus, the torque-amplifying gear set can substantially increase the operating torque provided by the operator assembly under a given actuation force and/or reduce the actuation force necessary to generate the required operating torque for the operator assembly.

In some embodiments, the operator assembly includes a powered actuator assembly to control operation of the operator assembly and movement of the window vent between (1) a closed and locked position; (2) a closed and unlocked position; (3) a partially open and unlocked position; and (4) a fully open and unlocked position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a plan view of the vent operator assembly in a closed and locked position;

FIG. 3 is a plan view of the vent operator assembly in a closed and unlocked position;

FIG. 4b is a partially exploded view of the configuration of FIG. 4a;

FIG. 5 is a plan view of a drive assembly of the vent operator assembly in the closed and locked position;

FIG. 6 is a plan view of the drive assembly in the closed and unlocked position;

FIG. 10 is a plan view of another drive assembly in a closed and locked position according to the principles of the present disclosure;

FIG. 11 is a plan view of the drive assembly of FIG. 10 in a closed and unlocked position;

FIG. 12 is a plan view of the drive assembly of FIG. 10 in an opened and unlocked position;

FIG. 13 is a plan view of the drive assembly of FIG. 10 in the closed and locked position and with the cover removed;

FIG. 14 is a plan view of the drive assembly of FIG. 10 in the closed and unlocked position and with the cover removed;

FIG. 15 is a plan view of the drive assembly of FIG. 10 in the opened and unlocked position and with the cover removed;

FIG. 17 is a plan view of still another drive assembly according to the principles of the present disclosure in a closed and locked position showing a portion of an arm and with the cover removed;

FIG. 18 is a plan view of the drive assembly shown in FIG. 17 in a closed and unlocked position;

FIG. 19 is a plan view of the drive assembly shown in FIG. 17 in a partially opened and unlocked position;

FIG. 20 is a plan view of the drive assembly shown in FIG. 17 in the fully opened position;

FIG. 21 is a perspective view of showing a portion of the drive assembly shown in FIG. 17 in a partially opened and unlocked position;

FIG. 22 shows a plan view of the disassembled components of the drive assembly shown in FIG. 17;

FIG. 23 shows a perspective view of a portion of the drive member of the drive assembly shown in FIG. 17;

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
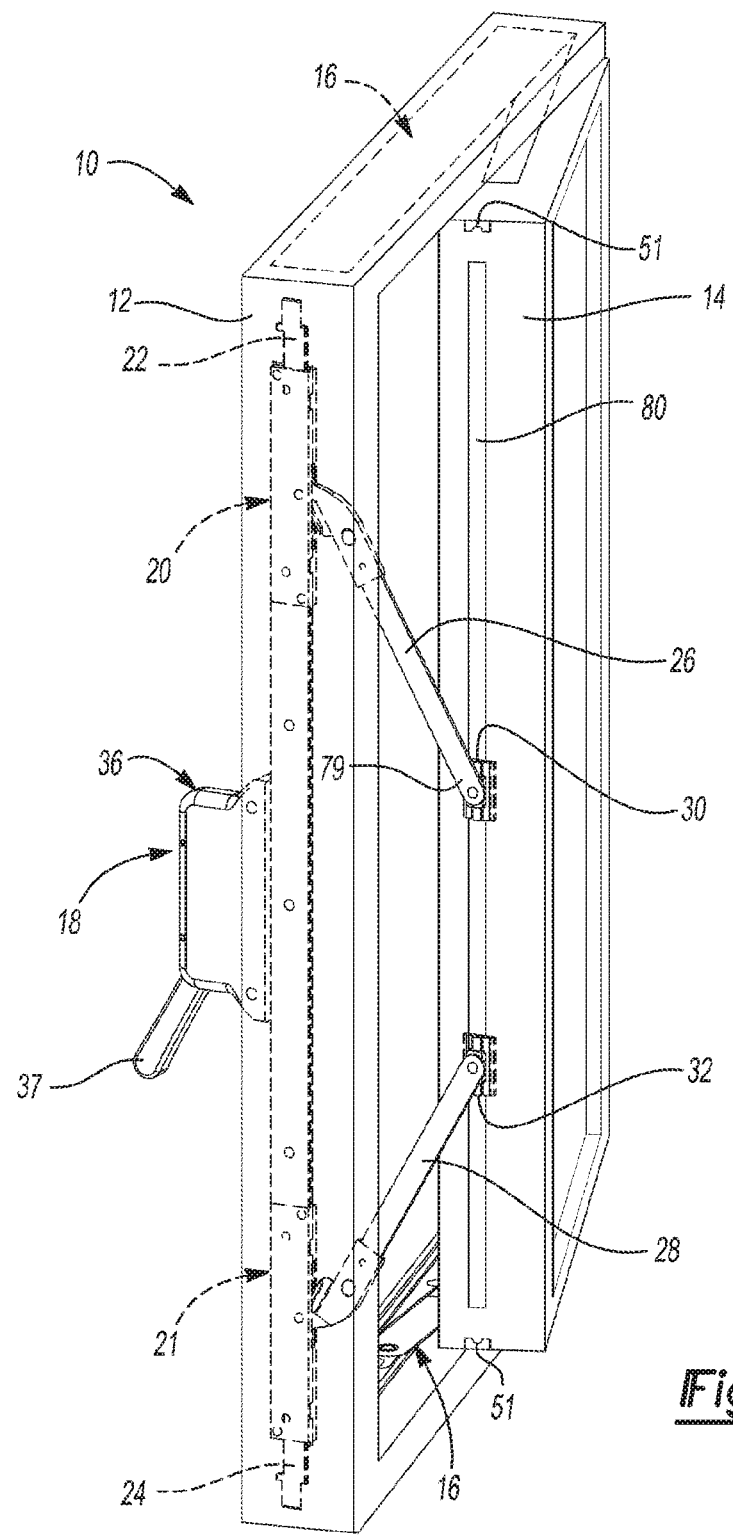
FIG. 1 is a perspective view of a window assembly having a vent operator assembly according to the principles of the present disclosure.

With reference to FIG. 1, a window assembly 10 is provided that may include a window frame 12, a window vent 14, a pair of hinge assemblies 16, and a vent operator assembly 18. The vent operator assembly 18 and hinge assemblies 16 allow the window vent 14 to move relative to the window frame 12 between an open position (FIGS. 1 and 4) and a closed position (FIGS. 2 and 3). The window assembly 10 shown in FIG. 1 is a casement-type window assembly. Therefore, the hinge assemblies 16 is disposed on horizontally extending sides of the window vent 14 and the vent operator assembly 18 is disposed on a vertically extending side of the window frame 12. However, it will be appreciated that the hinge assemblies 16 and vent operator assembly 18 could be incorporated into other types of window assemblies, such as a projection-type window assembly, for example.

Referring now to FIGS. 2-9, the vent operator assembly 18 may include a base 19, first and second drive assemblies 20, 21, and an actuator assembly 36. The first and second drive assemblies 20, 21 may include first and second drive members 22, 24, first and second arms 26, 28, first and second slide members 30, 32, and one or more cover members 34. As will be described in more detail below, a user may rotate a handle 37 of the actuator assembly 36 among a first position (FIG. 2) in which the window vent 14 is closed and locked relative to the window frame 12, a second position (FIG. 3) in which the window is closed but unlocked from the window frame 12, and a third position (FIG. 4) in which the window vent 14 is open and unlocked from the window frame 12.

The base 19 may be mounted to the window frame 12 and may include a track or channel 38 in which the first and second drive members 22, 24 are slidably received. The cover members 34 may fixedly engage the base 19 to retain the drive members 22, 24 and the arms 26, 28 therebetween while still allowing movement of the drive members 22, 24 and the arms 26, 28 relative to the cover members 34 and base 19.

The first and second drive members 22, 24 may be substantially mirror images of each other, but otherwise substantially similar or identical. Therefore, while FIGS. 5-7 depict the second drive member 24, it will be appreciated that the first drive member 22 may include features that are identical mirror-images of the features of the second drive member 24. The drive members 24 may each include first and second ends 40, 42 and a central recessed portion 43. The first and second ends 40, 42 may include first and second pegs 44, 45, respectively, and first and second stop tabs 46, 47, respectively. Interference between the first stop tab 46 and a first stop surface 48 of the base 19 and interference between the second stop tab 47 and a second stop surface 50 of the base 19 may limit the travel of the drive members 22, 24 relative to the base 19.

The first pegs 44 may engage a linkage 52 (shown schematically in FIGS. 2-4) of the actuator assembly 36 such that rotation of the handle 37 of the actuator assembly 36 causes corresponding linear sliding motion of the drive members 22, 24 relative to the base 19. When the handle 37 is in the first position shown in FIG. 2, the second pegs 45 may engage corresponding locking slots 51 (show schematically in FIG. 1) in the window vent 14 to lock the window vent 14 relative to the window frame 12. When the handle 37 is in the second or third position (FIGS. 3 and 4), the second pegs 45 are disengaged from the locking slots, thereby unlocking the window vent 14 from the window frame 12 to allow movement of the window vent 14 relative to the window frame 12.

Figure 4:
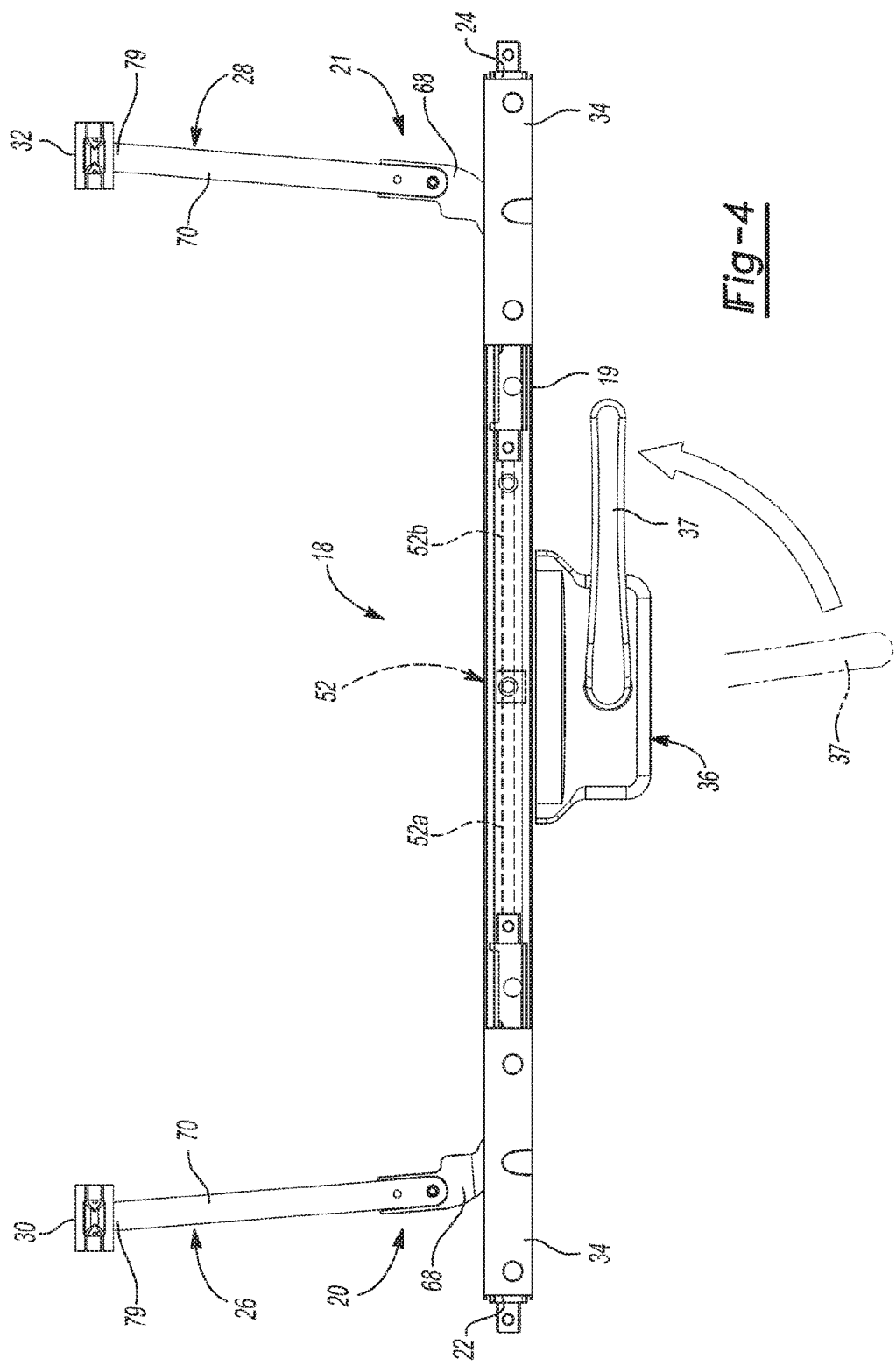
FIG. 4 is a plan view of the vent operator assembly in an opened and unlocked position.

The central recessed portion 43 of the drive members 22, 24 may include first and second ramped surfaces 52, 54 and a bottom surface 56 disposed between the first and second ramped surfaces 52, 54. As shown in FIGS. 2-4, a portion of the arms 26, 28 may be movably received in the central recessed portion 43. A plurality of rack teeth 58 may extend from the bottom surface 56 adjacent the second ramped surface 54 and spaced apart from the first ramped surface 52. That is, the bottom surface 56 includes a flat portion 60 between the rack teeth 58 and the first ramped surface 52. In some embodiments, the flat portion 60 may have a length approximately equal to or greater than a distance between the first and second ramped surfaces 52, 54. In other embodiments, the length of the flat portion could be less than half of the distance between the first and second ramped surfaces 52, 54. As shown in FIGS. 2-4, a portion of the arms 26, 28 may be received in the central recessed portion 43.

The central recessed portion 43 may also include a tab 62 located proximate the first ramped surface 52. The tab 62 may include a tapered end 64. As will be described in more detail below, the tab 62 may be slidably received in a slot 66 in the corresponding arm 26, 28 when the handle 37 of the actuator assembly 36 is in the first position and between the first and second positions (see FIGS. 5 and 6).

The first and second arms 26, 28 can also be substantially identical mirror-images of each other. The arms 26, 28 may include first and second portions 68, 70. The first portion 68 of each arm 26, 28 may include a rotation aperture 72 that receives a rotation pin 74 (FIG. 9) that extends between the base 19 and cover 34 and defines an axis about which the arm 26, 28 rotates relative to the base 19. The rotation pin 74 can be integrally formed with the cover 34. The slot 66 that slidably receives the tab 62 of the drive member 22, 24 is formed in the first portion 68. The first portion 68 may also include pinion portion including a plurality of gear teeth 76 arranged in a curved pattern around the rotation aperture 72. The gear teeth 76 can meshingly engage the rack teeth 58 of the drive members 22, 24 (see FIGS. 6 and 7). One of the gear teeth 76 can slide along the flat portion 60 of the central recessed portion 43 of the drive members 22, 24 when the handle 37 is moved between the first and second positions (see FIGS. 5 and 6).

The second portion 70 of each arm 26, 28 may be partially received in a recess 78 (FIG. 8) in the first portion 68 and fixed to the first portion 68 by one or more fasteners. Forming the arms 26, 28 from the discrete first and second portions 68, 70 allows for the vent operator assembly 18 to be used with second portions 70 of a desired length to suit a given application. For example, in commercial or industrial window applications, a second portion 70 may be chosen that has a length that allows for a relatively smaller amount of travel of the window vent 14 between the open and closed positions (i.e., a smaller angle between the vent 14 and frame 12 in the fully open position). In residential window applications, a second portion 70 may be chosen that has a length that allows for a relatively larger amount of travel of the window vent 14 between the open and closed positions (i.e., a larger angle between the vent 14 and frame 12 in the fully open position). In some embodiments, the first and second portions 68, 70 could be integrally formed as a unitary body.

Figure 8:
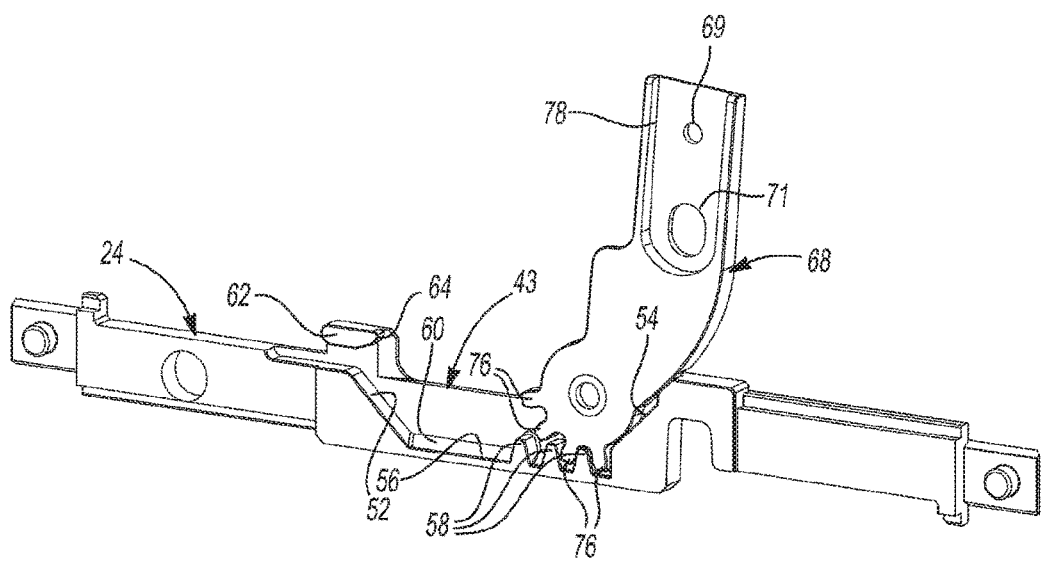
FIG. 8 is a perspective view of a drive member and a portion of an arm of the drive assembly in the opened and unlocked position.
Figure 9:
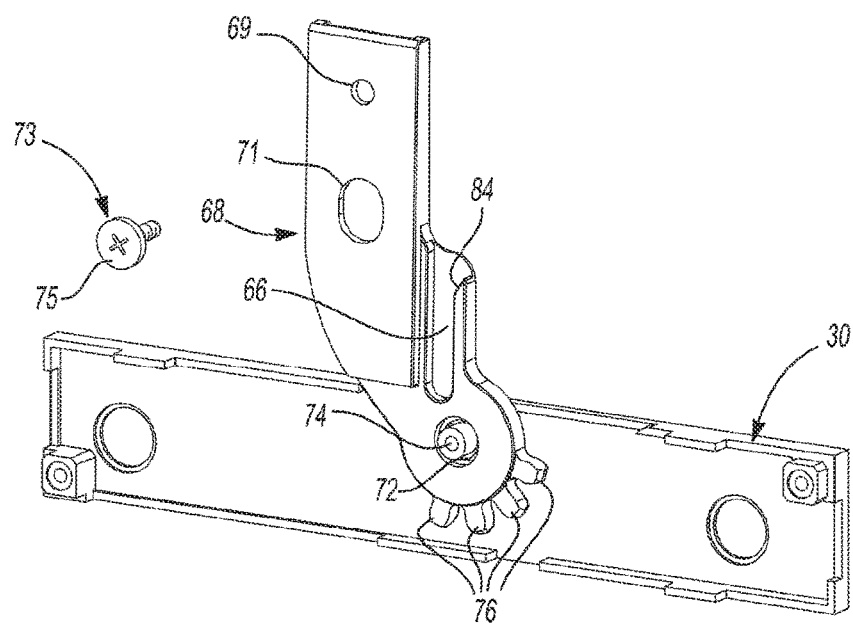
FIG. 9 is a perspective view of a cover and the portion of the arm of the drive assembly in the opened and unlocked position.
Figure 16:
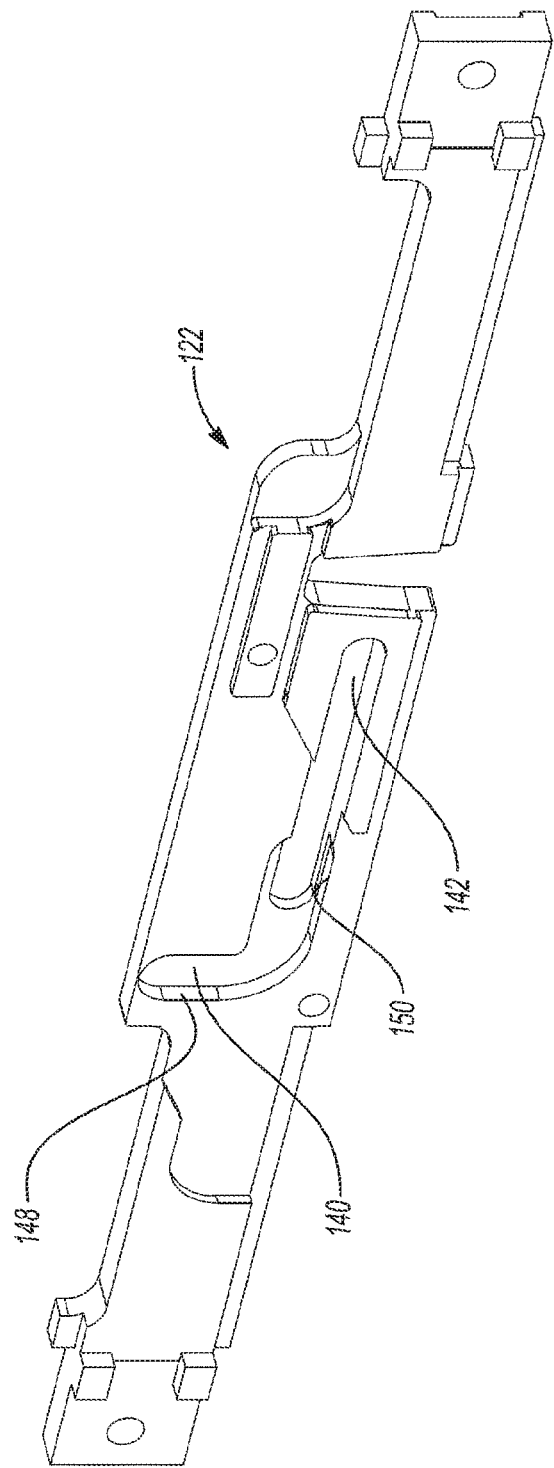
FIG. 16 is a perspective view of a drive member of the drive assembly of FIG. 10.

In addition, as shown in FIGS. 8 and 9, the first portion 68 of the arm 26, 28 can include two, dissimilarly-sized mounting apertures 69 and 71. A first aperture 69 is generally circularly-shaped and can accommodate a standard-type threaded fastener. The fastener can fixedly mount the second portion 70 of the arm 26, 28 to the first portion. A second aperture 71 can be generally eccentrically-shaped or oval, having a greater dimension along a first axis and a lesser dimension along a second axis. The second aperture 71 can accommodate a threaded fastener 73 having an eccentrically shaped head 75. The eccentric head 75 can act as a cam and the second aperture 71 can act as a follower so that minute adjustments can be made to the alignment of the second portion 70 of the arm 26, 28 relative to the first portion 68 when the second portion 70 of the arm 26, 28 is attached to the first portion 68 of the arm 26, 28. In this regard, the second portion 70 can reside in the recess 78 of the first portion 68 but can also pivot slightly about an axis extending through the first aperture 69 as the eccentric head 75 of the fastener 73 acts laterally against the eccentric second aperture 71. Thereby slight adjustments can be made to the alignment between the first and second portions of the arm 26, 28. Correspondingly, adjustments can be made to the relative operational timing between the plurality of drive assemblies 20, 21 to accommodate the synchronous opening and closing of the drive assemblies 20, 21 and smooth operation of the vent operator 18.

Figure 1A:
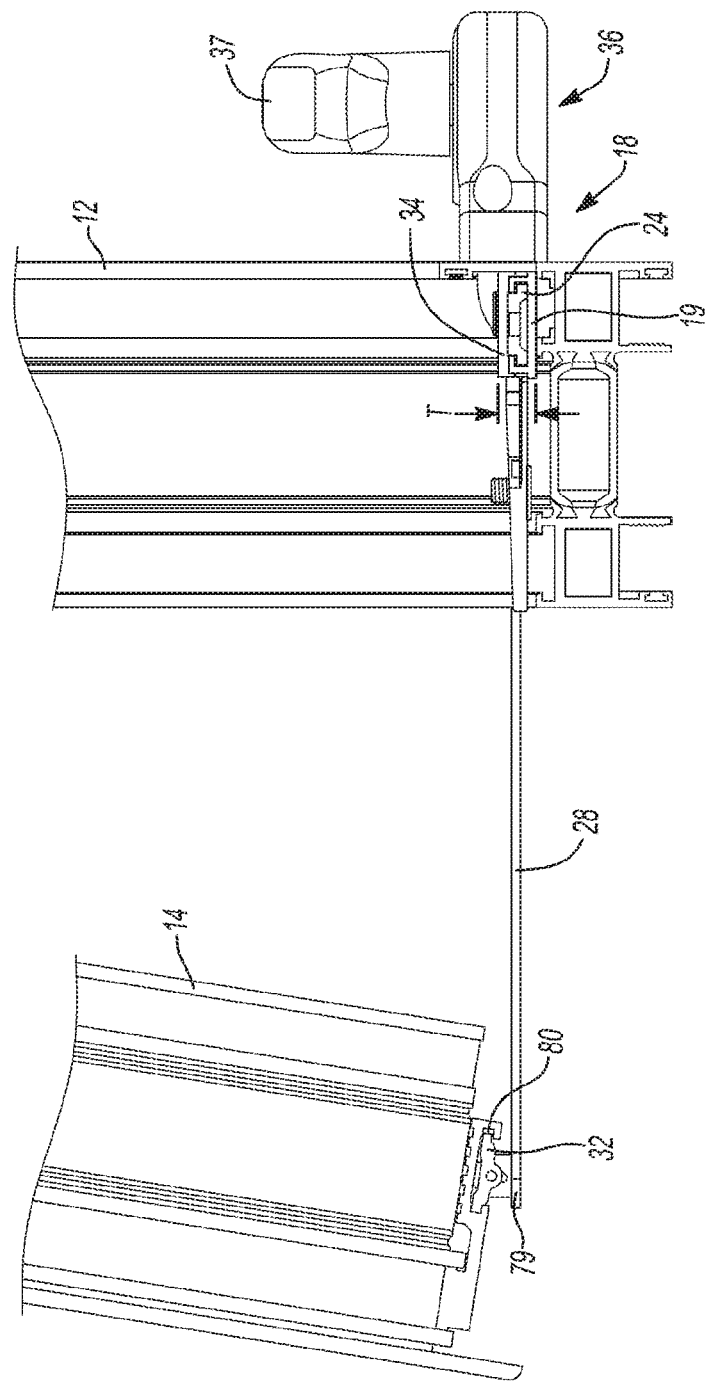
FIG. 1a is a cross-sectional view of the window assembly of FIG. 1.

The first and second slide members 30, 32 may pivotably engage ends 79 of the second portions 70 of the arms 26, 28, respectively. As the handle 37 of the actuator assembly 36 moves between the second and third positions (FIGS. 3 and 4), the slide members 30, 32 slide along a track 80 (FIGS. 1 and 1a) formed in the window vent 14.

With continued reference to FIGS. 1-9, operation of the window assembly 10 will be described in detail. As described above, a user may rotate the handle 37 of the actuator assembly 36 between the positions shown in FIGS. 2 and 4 to move the vent operator assembly 18 and the window vent 14 between (1) a closed and locked position shown in FIGS. 2 and 5; (2) a closed and unlocked position shown in FIGS. 3 and 6; and (3) an open and unlocked position shown in FIGS. 4 and 7. Rotation of the handle 37 causes corresponding linear motion of the first and second drive members 22, 24 toward and away from the center of the base 19. As shown in FIGS. 2-4, only a portion of the linear travel of the drive members 22, 24 causes corresponding rotation of the arms 26, 28 and rotation of the window vent 14 relative to the window frame 12. That is, the motion of the drive members 22, 24 caused by a first stage of rotation of the handle 37 between the first position (FIG. 2) and the second position (FIG. 3) moves the drive members 22, 24 out of engagement with the locking slots 51 of the window vent 14 (i.e., to unlock the window vent 14 from the window frame 12) and does not move the arms 26, 28 or the window vent 14 relative to the frame 12. The arms 26, 28 and window vent 14 only move in response to a second stage of movement of the handle 37 between the second and third positions (FIGS. 3 and 4). This staged movement of the vent operator assembly 18 (i.e., moving the arms 26, 28 and window vent 14 in one stage and locking or unlocking the window vent 14 to the frame 12 in another separate stage) eliminates binding or jamming that can occur in mechanisms that simultaneously close and lock a window vent.

Starting from the closed and locked position shown in FIGS. 2 and 5, rotation of the handle 37 from the first position (FIG. 2) to the second position (FIG. 3) causes the first and second drive members 22, 24 to move relative to the base 19 and cover 34 in linear directions toward each other. As shown in FIGS. 5 and 6, this first stage of linear motion of the drive members 22, 24 causes the flat portion 60 of the central recessed portion 43 to slide along one of the gear teeth 76 of the arms 26, 28 (without rotating the arms 26, 28) until one of the gear teeth 76 contacts one of the rack teeth 58 of the drive members 22, 24 when the handle 37 reaches the second position.

Thereafter, continued rotation of the handle 37 from the second position toward the third position (FIG. 4) causes the drive members 22, 24 to continue to move relative to the base 19 and cover 34 in linear paths toward each other, thereby causing the rack teeth 58 of the drive members 22, 24 to drivingly engage the gear teeth 76 of the arms 26, 28 and rotate the arms 26, 28 to the fully open position shown in FIGS. 4 and 7.

In the fully open position, the arms 26, 28 may be angled relative to each other rather than parallel to each other. That is, the arms 26, 28 may rotate more than ninety degrees between the fully closed position (FIGS. 2 and 3) and the fully open position (FIG. 4). In this manner, a force applied to the window vent 14 (such as wind, for example) biasing the window vent 14 toward the closed position will tend to urge the arms 26, 28 further away from the closed position rather than urging the arms 26, 28 toward the closed position (as described above, the stop tabs 47 of the drive members 22, 24 would prevent any further motion of the arms 26, 28 away from the closed position from the fully open position). Therefore, the orientation of the arms 26, 28 in the fully open position prevents the window vent 14 from being inadvertently closed by a gust of wind or some other external force.

To close the window vent 14, the handle 37 may be rotated from the third position (FIG. 4) toward the second position (FIG. 3). Such rotation of the handle 37 causes the drive members 22, 24 to slide linearly away from each other and causes the rack teeth 58 to rotate the arms 26, 28 back toward the closed position shown in FIGS. 3 and 6. As the drive members 22, 24 and arms 26, 28 move into the closed position shown in FIG. 6, the tapered end 64 of the tab 62 of the drive members 22, 24 may slightly interfere with a surface 84 (FIG. 9) defining the opening to the slot 66 in the arms 26, 28. The tapered shapes of the surface 84 and the tapered end 64 of the tab 62 may cause the arms 26, 28 to shift relative to the rotation pin 74 about which the arms 26, 28 rotate. That is, the relatively large diameter of the rotation aperture 72 compared to the relatively smaller diameter of the rotation pin 74 allows for the shifting of the arms 26, 28 to allow the tab 62 to be received into the slot 66.

Figure 6A:
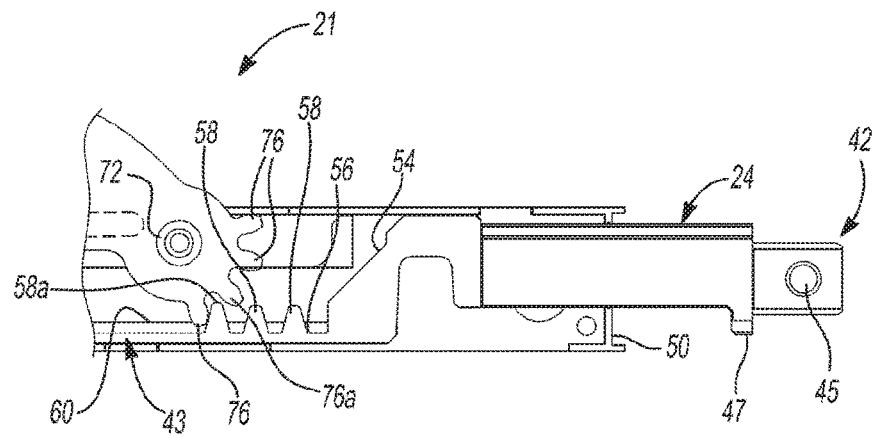
FIG. 6a is a partial view of an exemplary configuration of the drive assembly.
Figure 7:
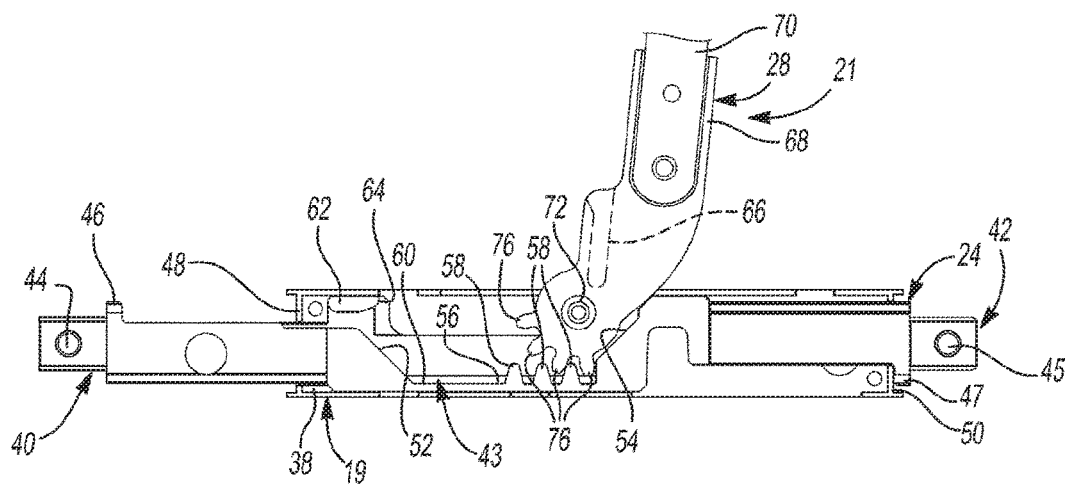
FIG. 7 is a plan view of the drive assembly in the opened and unlocked position.

As shown in FIG. 6a, in some embodiments, the tooth 58a closest to the flat portion 60 may be slightly larger (e.g., taller and/or wider) than the other teeth 58 so that the second tooth 76a of the arm 28 interferes with the tooth 58 closest to the flat portion 60 when the drive member 24 continues to move to the right toward the position shown in FIG. 5. This interference causes the arm 28 to kick or shift (e.g., in a camming action) relative to the rotation pin 74 (i.e., the size difference between the pin 74 and aperture 72 provides clearance for shifting of the pin 74 within the aperture 72) to align the tab 62 with the slot 66 so that the tab 62 can be received in the slot 66 upon further movement of the drive member 24 toward the position shown in FIG. 5. In some embodiments, the interference described above between the second tooth 76a and the tooth 58a closest to the flat portion 60 may exist even if the tooth 58a is the same size as the rest of the teeth 58.

Thereafter, continued rotation of the handle 37 toward the first position (FIG. 2) will cause the tab 62 to slide further into the slot 66 to cinch the arms 26, 28 in the closed position while the tabs 45 slide back into engagement with the locking slots 51 to lock the window vent 14 relative to the window frame 12. In the closed and locked position (FIGS. 2 and 5), the tabs 62 received within the slots 66 provide additional locking features that prevent movement of the vent operator assembly 18 and the window vent 14 out of the closed position. The tabs 62 and slots 66 provide two additional locking points between the locking points provided by engagement between the pegs 45 and locking slots 51, thereby further securing the window vent 14 in the closed position.

The structure of the drive assemblies 20, 21 described herein and shown in the figures allows the thickness T (FIG. 1a) of the drive assemblies 20, 21 to be substantially smaller than the thicknesses of prior-art drive mechanisms. Typical prior-art drive mechanisms are designed to account for a certain amount of interference with the window vent 14 when the window vent 14 moves into the closed position by allowing for some flex or play in the manner in which the components of the drive mechanisms are assembled. Unlike the prior art, the drive assemblies 20, 21 of the present disclosure are thin enough (in some examples, the thickness T may be about 0.625 inches thick or less) to provide clearance for the window vent 14 to move into a closed position in which the window vent 14 is seated against the frame 12 without interfering with the drive assemblies 20, 21 and without having to flex or shift the drive assemblies 20, 21 out of the way.

While the vent operator assembly 18 depicted in the figures includes two arms 26, 28 and the actuator assembly 36 disposed midway between the arms 26, 28, in some embodiments, the actuator assembly 36 could be disposed off-center (i.e., closer to one of the arms 26, 28 than the other). With the actuator assembly 36 midway between the drive assemblies 20, 21 (as shown in FIG. 4), links 52a, 52b are substantially equal in length. To change the configuration of the vent operator assembly 18 so that the actuator assembly 36 is off-center, the only modification that needs to be made is to replace the links 52a, 52b shown in FIG. 4 with links 52a, 52b having different lengths (i.e., link 52a could be shorter and link 52b could be longer or vice versa). This provides for flexibility in locating the handle 37 anywhere along the frame 12.

Figure 4A:
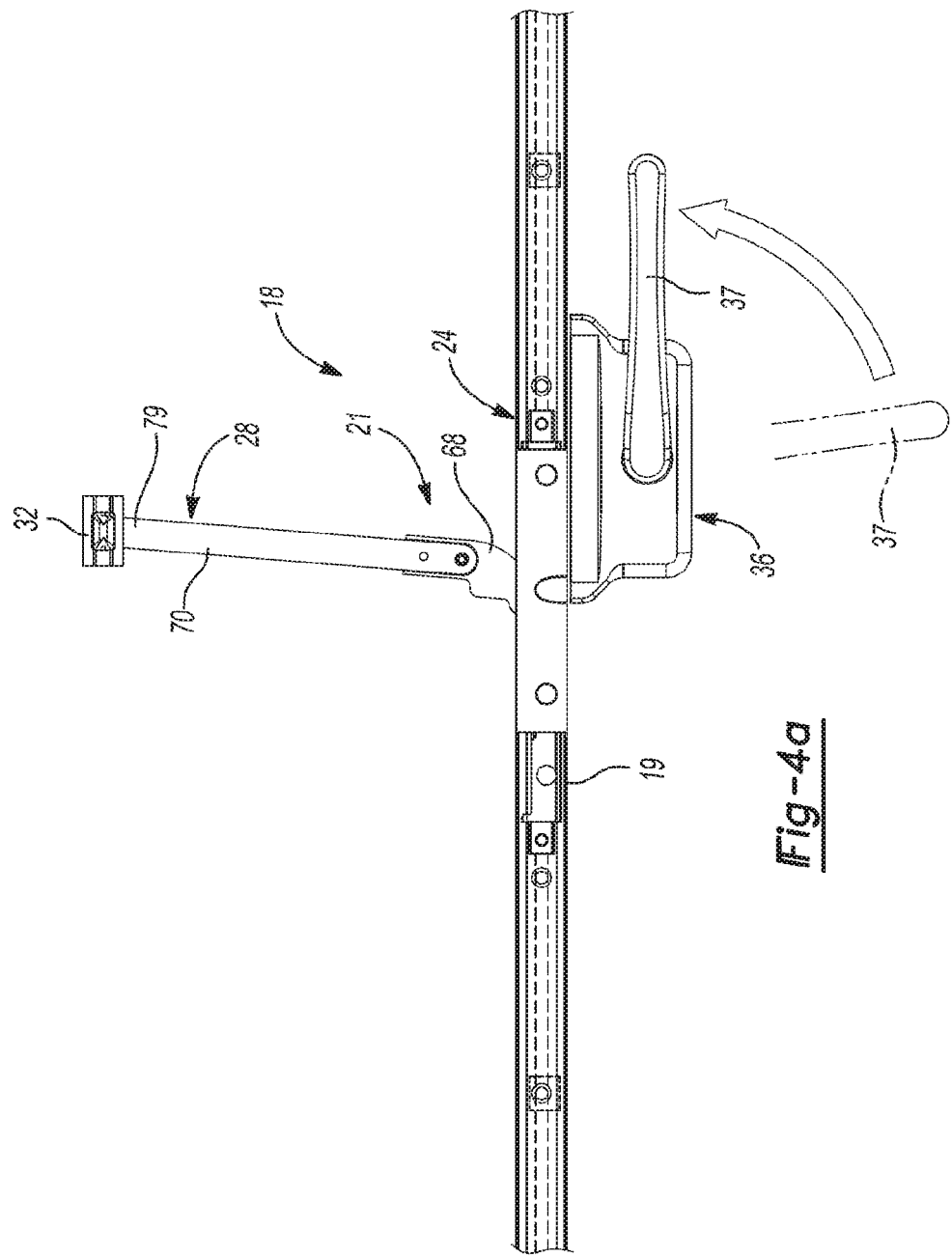
FIG. 4a is a plan view of an exemplary configuration of the drive assembly.
Figure 4B:
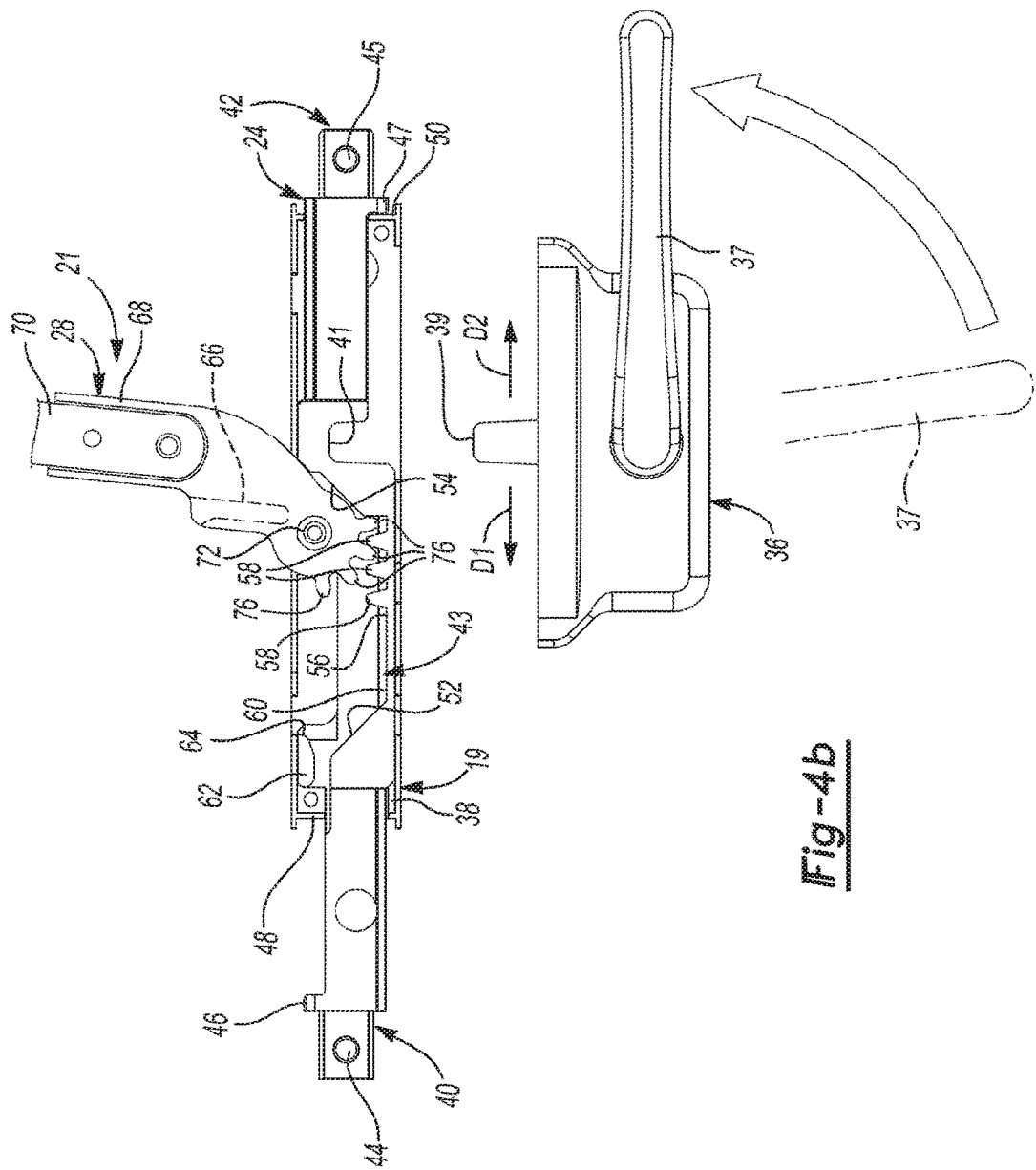

In some embodiments, the vent operator assembly 18 could include only a single arm 26 or 28 (as shown in FIG. 4a) rather than two arms 26, 28 (as shown in FIG. 4). In such embodiments, a tab 39 driven by the handle 37 may be received directly in a slot or notch 41 in the drive member 24, as shown in FIG. 4b. Rotation of the handle 37 causes the tab 39 to move linearly left and right (relative to the frame of reference of FIG. 4b) in directions D1 and D2, thereby moving the drive member 24 to the left and right in directions D1 and D2 to operate the vent operator assembly 18 as described above.

With reference to FIGS. 10-16, another drive assembly 120 is provided. One or more of the drive assemblies 120 (or one of the drive assemblies 120 and a mirror image of the drive assembly 120) may be incorporated into the vent operator assembly 18 described above in place of the drive assemblies 20, 21. The function and operation of the vent operator assembly 18 using the drive assemblies 20, 21 may be similar or identical to the function and operation of the vent operator assembly 18 when used with the drive assembly 120. Therefore, similar structures, functions and operations may not be described again in detail.

The drive assembly 120 may include a drive member 122, a first link arm 124, a second link arm 126 pivotably coupled to the first link arm 124 and the base 19, and a cover 134 fixedly attached to the base 19. Like the drive members 22, 24 described above, the drive member 122 may be slidably received in a channel formed between the base 19 and the cover 134. The actuator assembly 36 may slide the drive member 122 in a linear path between a first position (FIGS. 10 and 13) corresponding to the closed and locked position described above, a second position (FIGS. 11 and 14) corresponding to the closed and unlocked position described above, and a third position (FIGS. 12 and 15) corresponding to the open and unlocked position described above. the drive member 122 may include a generally L-shaped first slot 140 and a linear second slot 142 (shown best in FIG. 16). A peg (not shown) extending from the base 19 may be slidably received in the second slot 142. Another peg 144 attached to an end of the first link arm 124 may be slidably received in the first slot 140. The cover 134 may include an inclined third slot 146 that also slidably receives the peg 144.

As described above, a user may rotate the handle 37 of the actuator assembly 36 between the first and second positions to move one or more drive assemblies 120 and the window vent 14 between (1) a closed and locked position shown in FIGS. 10 and 13; (2) a closed and unlocked position shown in FIGS. 11 and 14; and (3) an open and unlocked position shown in FIGS. 12 and 15. The drive member 122 is operably coupled to the actuator assembly 36 such that rotation of the handle 37 causes corresponding linear motion of the drive member 122. Only a portion of the linear travel of the drive member 122 causes corresponding rotation of the link arms 124, 126 and rotation of the window vent 14 relative to the window frame 12. That is, the motion of the drive member 122 caused by a first stage of rotation of the handle between the first position and the second position moves the drive member 122 out of engagement with the locking slot 51 of the window vent 14 (i.e., to unlock the window vent 14 from the window frame 12) and does not move the link arms 124, 126 or the window vent 14 relative to the frame 12. The link arms 124, 126 and window vent 14 only move in response to a second stage of movement of the handle 37 between the second and third positions, as described above.

Starting from the closed and locked position (FIGS. 10 and 13), rotation of the handle 37 from the first position to the second position causes the drive members 122 to move linearly relative to the base 19 and cover 134 from the position shown in FIGS. 10 and 13 to the position shown in FIGS. 11 and 14. As the drive member 122 slides from the position shown in FIGS. 10 and 13 to the position shown in FIGS. 11 and 14, the L-shaped slot 140 in the drive member 122 moves relative to the peg 144 such that the peg 144 slides from one end of a horizontally extending portion 148 of the slot 140 to the other end of the horizontally extending portion 148 of the slot 140. Such relative motion between the slot 140 and peg 144 along the horizontally extending portion 148 of the slot 140 causes no corresponding rotational motion of the link arms 124, 126.

Continued rotation of the handle 37 from the second position to the third position causes the drive member 122 to continue to slide linearly relative to the base 19 and cover 34 from the position shown in FIGS. 11 and 14 to the position shown in FIGS. 12 and 15. Such motion of the drive member 122 causes the peg 144 to slide vertically up a vertically extending portion 150 of the slot 140 while simultaneously sliding up the inclined portion of the slot 146 in the cover 134, thereby causing the first and second link arms 124, 126 to rotate to the open position (as shown in FIGS. 12 and 15).

The window vent 14 can be closed by rotating the handle 37 in the opposite direction to reverse the steps described above. That is, the handle is first moved from the third position to the second position to move the drive assembly 120 and window vent 14 to the closed position. Then the handle is moved from the second position to the first position to move the drive assembly 120 to the closed and locked position and engage the drive member 122 with a locking feature on the window vent 14.

With reference to FIGS. 17-23, still another drive assembly 221 is provided. It is to be understood that one or more of the drive assemblies 221 (or one of the drive assemblies 221 and a mirror image of the drive assembly 221) may be incorporated into the vent operator assembly 18 as discussed herein in place of the drive assemblies 20, 21. The function and operation of the vent operator assembly 18 using the drive assembly 221 may be similar or identical to the function and operation of the vent operator assembly 18 when used with the drive assemblies 20, 21. Therefore, similar structures, functions and operations may not be described again in detail, and similar reference nos. used in connection with drive assembly 221 may identify structures similar to those of drive assemblies 20, 21.

Referring now to FIGS. 17-21, the drive assembly 221 is shown with its cover removed. The drive assembly 221 may include drive member 224 and arm 228. As described, a user may rotate a handle 37 of the actuator assembly 36 among a first position, second position and third position to operate the vent operator assembly 18 including the drive assembly 221. As previously described, in the first position the window vent 14 is closed and locked relative to the window frame 12, in the second position the window is closed but unlocked from the window frame 12, and in the third position the window vent 14 is open and unlocked from the window frame 12.

As best shown in FIGS. 21 and 22, the drive assembly 221 can reduce the force needed to operate the vent operator assembly 18. To this end, the drive assembly 221 also includes a torque-amplifying gear set including the toothed rack 257 of the drive member 224, a pinion 281 including a drive gear 282 and a reduction gear 283, and gear teeth 276 arranged on the arm 228 in a curved pattern around the rotation aperture 272. The drive gear 282 and the reduction gear 283 can be integrally formed, as shown in the figures.

FIGS. 21 and 22 illustrate the components of the drive assembly 221 in greater detail. The drive member 224 is slidably received in the track or channel 238 which extends along a longitudinal axis X of the base 219. The pinion 281 is rotatably mounted to the base 219 via the rotation aperture 273 and the rotation pin 275 that is integrally formed in the base 219. The arm 228 is rotatably mounted to the base via the rotation aperture 272 and the rotation pin 274 such that it rests upon a boss 277 and is raised from the channel 238, so that the gear teeth 276 can be properly aligned to meshingly engage the reduction gear 283, as further described herein. The rotation pin 274 and the boss 277 are also integrally formed in the base 219.

The drive member 224 (also shown in FIG. 23) has a central recessed portion 243 that may include a plurality of curved surfaces 252, 253 and 254, and a bottom surface 256 disposed between the curved surfaces 252 and 253, 254. A rack 257 including a plurality of rack teeth 258 may form a portion of the bottom surface 256 adjacent the curved surface 254 and spaced apart from the curved surface 252. That is, the bottom surface 256 includes a flat portion 260 between the rack teeth 258 and the curved surface 252. A length of the flat portion 260 may vary. As shown in FIGS. 17-21, a portion of the arm 228 may be received in the central recessed portion 243 of the drive member 224.

As seen in FIG. 21, the reduction gear 283 and the drive gear 282 can be joined or connected in a stacked relationship so that rotational movement of the reduction gear 283 produces corresponding rotational movement of the drive gear 282 and vice versa. Also shown in FIG. 21, the gear teeth 276 on the arm 228 are aligned with and can meshingly engage the reduction gear 283, while the rack 257 and drive gear 282 are aligned and the rack teeth 258 can meshingly engage the drive gear 282.

With continued reference to FIGS. 17-23, operation of the window assembly 10 can be accomplished in a manner similar to as previously described. A user may rotate the handle 37 of the actuator assembly 36 to move the vent operator assembly 18 and the window vent 14 between (1) a closed and locked position shown in FIG. 17; (2) a closed and unlocked position shown in FIG. 18; (3) a partially open and unlocked position shown in FIG. 19; and (4) a fully open and unlocked position shown in FIG. 20. Rotation of the handle 37 causes corresponding linear motion of the drive members 240 relative to the base 219. As shown in FIGS. 17-20, only a portion of the linear travel of the drive member 224 causes corresponding rotation of the arm 228 and rotation of the window vent 14 relative to the window frame 12. That is, the motion of the drive member 224 caused by a first stage of rotation of the handle 37 between the first position (e.g., FIGS. 2 and 17) and the second position (e.g., FIGS. 3 and 18) moves the drive member 224 out of engagement with the locking slots 51 of the window vent 14 (i.e., to unlock the window vent 14 from the window frame 12) and does not move the arm 228 or the window vent 14 relative to the frame 12. The arm 228 and window vent 14 only move in response to a second stage of movement of the handle 37 between the second and third positions (e.g., FIGS. 3, 19 and 20). As previously discussed, this staged movement of the vent operator assembly 18 (i.e., moving the arm 228 and window vent 14 in one stage and locking or unlocking the window vent 14 to the frame 12 in another separate stage) eliminates binding or jamming that can occur in mechanisms that simultaneously close and lock a window vent.

Starting from the closed and locked position shown in FIG. 17, rotation of the handle 37 from the first position to the second position causes the drive member 224 to move relative to the base 219 and in a linear direction (from left-to-right as illustrated in FIGS. 17 and 18). As shown in FIGS. 17 and 18, this first stage of linear motion of the drive member 224 causes the flat portion 260 of the central recessed portion 243 to slide along the drive gear 282 of the pinion 281 (without rotating the drive gear 282) until one of the teeth of the drive gear 282 contacts one of the rack teeth 258 of the drive member 224 when the handle 37 reaches the second position.

Thereafter, continued rotation of the handle 37 from the second position toward the third position causes the drive member 224 to continue to move relative to the base 219 in a linear path, thereby causing the rack teeth 258 of the drive member 224 to drivingly engage the drive gear 282 and rotate the pinion 281. Correspondingly, the reduction gear 283 is likewise rotated to drivingly engage the gear teeth 276 of the arm 228 and rotate the arm 228 to first partially and then to the fully open position, as shown in FIGS. 19 and 20.

In the fully open position, the arm 228 may rotate more than ninety degrees between the fully closed position and the fully open position. In this manner, a force applied to the window vent 14 (such as wind, for example) biasing the window vent 14 toward the closed position will tend to urge the arm 228 further away from the closed position rather than urging the arm 228 toward the closed position, as described above. Therefore, the orientation of the arm 228 in the fully open position prevents the window vent 14 from being inadvertently closed by a gust of wind or some other external force.

To close the window vent 14, the handle 37 may be rotated from the third position toward the second position. Such rotation of the handle 37 causes the drive member 224 to slide linearly in the opposite direction (i.e., from right-to-left as illustrated in FIG. 20) to reverse the operation just described.

With the torque-amplifying gear set described above, the drive assembly 221 can reduce the force needed to operate the vent operator assembly 18 and/or increase the operating capacity for the vent operator assembly 18, e.g., by allowing for larger and/or heavier window vents to be serviced. Thus, the torque-amplifying gear set can substantially increase the operating torque provided by the vent operator assembly under a given actuation force and/or reduce the actuation force necessary to generate the required operating torque for the vent operator assembly. For example, a vent operator assembly constructed to include the drive assembly 221 has been demonstrated to reduce the required actuation force for a given vent operator assembly by as much as 30 percent.

Figure 24:
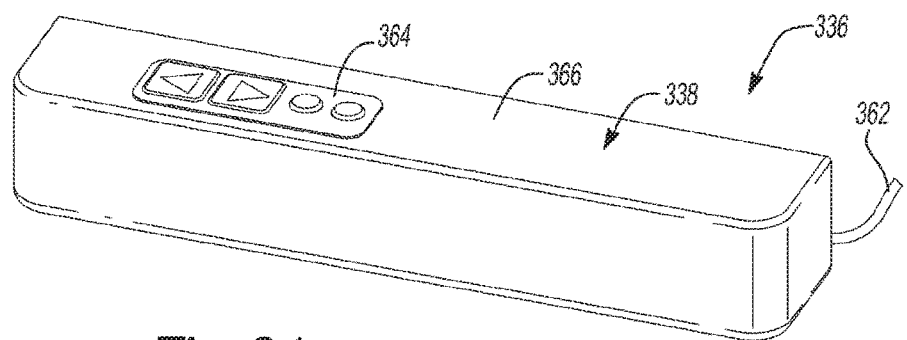
FIG. 24 shows a front perspective view of a powered actuator assembly according to the principles of the present disclosure.
Figure 25:
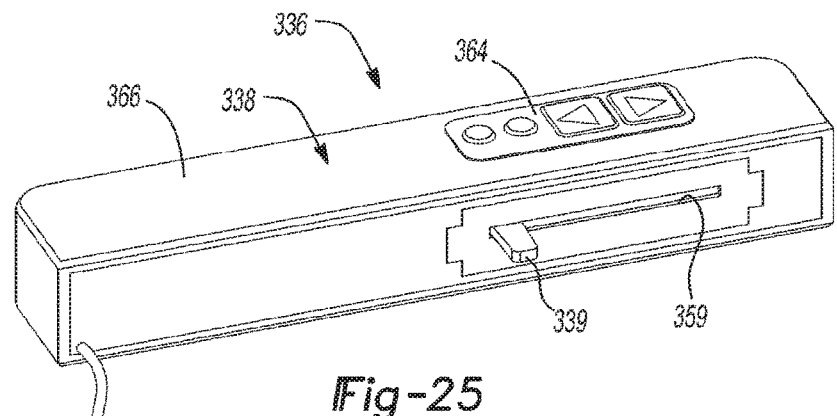
FIG. 25 shows a rear perspective view of the powered actuator assembly shown in FIG. 24.
Figure 26:
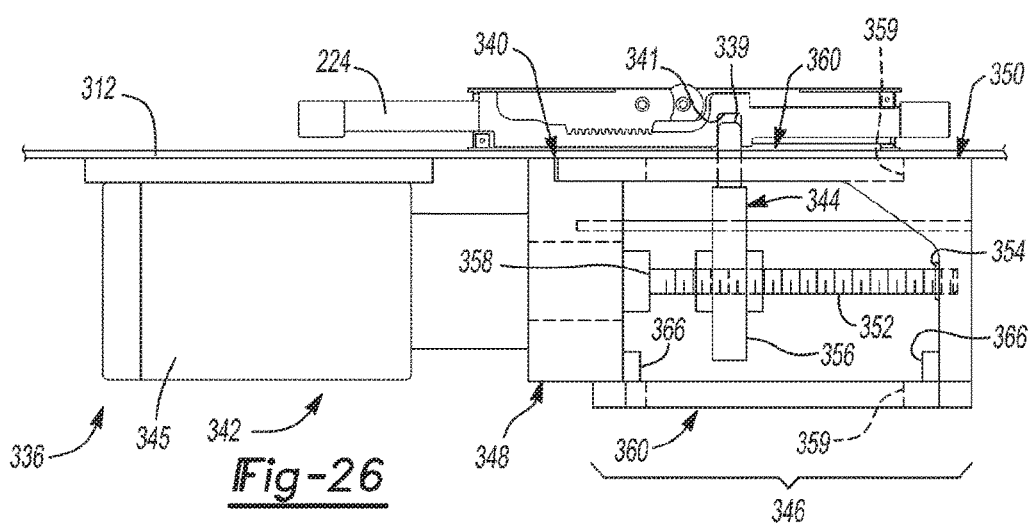
FIG. 26 shows a top perspective view of the powered actuator assembly according to the principles of the present disclosure with the cover removed.

Turning now to FIGS. 24-26, a powered actuator assembly 336 is shown that can be used in place of the actuator assembly 36 to control operation of the vent operator assembly 18 and movement of the window vent 14 between (1) a closed and locked position; (2) a closed and unlocked position; (3) a partially open and unlocked position; and (4) a fully open and unlocked position as already described. FIGS. 24 and 25 show views of the powered actuator assembly 336 standing alone, and FIG. 26 shows the powered actuator assembly 336 with its cover 338 removed and mounted to a window frame 312.

As seen in FIG. 26, the powered actuator assembly 336 includes a frame 340 to which is mounted a motor/drive mechanism 342. The motor/drive mechanism 342 controls the linear movement of an actuator 344, which can, via the actuator tab 339, engage the slot or notch 341 of the drive member 22, 24, 122, 224 of the drive assembly 20, 21, 120, 221. Linear movement of the actuator 344, in turn, moves the drive member 22, 24, 122, 224 in the channel 38, 238 to unlock, open, close and lock the window vent 14, as previously discussed. It should be understood that, as previously described with respect to the actuator assembly 36, there is flexibility in locating the powered actuator assembly 336 depending on a particular configuration of the vent operator assembly.

The motor/drive mechanism 342 can include a motor 345 and a lead screw assembly 346. The motor 345 is mounted at a first end portion 348 of the frame 340. The lead screw assembly 346 extends between the first end portion 348 of the frame 340 and a second end portion 350 of the frame 340. Any of a variety of commercially available DC motors are well-suited for use in the motor/drive mechanism 342. A power cable 362 (FIG. 24) provides power to the motor 345. As also shown in FIG. 26, limit switches 366 can be provided at locations on the opposite sides of the actuator 344 to provide stop limits for the travel of the actuator 344. As is known, when the limit switches 366 are engaged, power to the motor 345 can be interrupted to prevent the actuator 344 from further advancing in a direction of travel. Although a limit switch is illustrated in the figures, actuator travel can alternatively be monitored and/or controlled using any of other various known position sensing technologies, such as a linear encoder, linear resistive positioning sensors, or the like.

The lead screw assembly 346 includes a male-threaded screw member 352 that is rotationally driven by the motor 345. The screw member 352 is coupled to the motor 345 at a first end and is mounted to the frame 340 at its opposite end via bearing 354 that enables the motor 345 to rotationally drive the screw member 352 relative to the frame 340. The actuator 344 includes a body portion 356 having a female-threaded aperture 358 which correspondingly engages the screw member 352. As such, rotation of the screw member 352 in first and second directions can cause corresponding back and forth linear movement of the actuator 344 between the first and second end portions 348, 350 of the frame. The linear movement of the actuator 344 can be aligned with and/or guided by slots or channels 359 included in opposite side portions 360 of the frame 340.

The powered actuator assembly 336 can include a control 364 located on the cover 338 in a position convenient to access by a user. As shown in FIGS. 24 and 25, the control 364 can be included on an upper face 366 of the cover 338. The control 364 can be a manually or remotely actuated. In this regard, the control can include a switch, button, or the like, and/or can incorporate a radio frequency (RF) or infra-red (IR) transceiver, or a communications controller (e.g., a network interface module). As such, the powered actuator assembly 336 can be connectable with a computer network, such as via a wired (e.g., Ethernet) or wireless (e.g., 802.11) connection, and/or Bluetooth or the like for remote actuation and monitoring.

Figure 27:
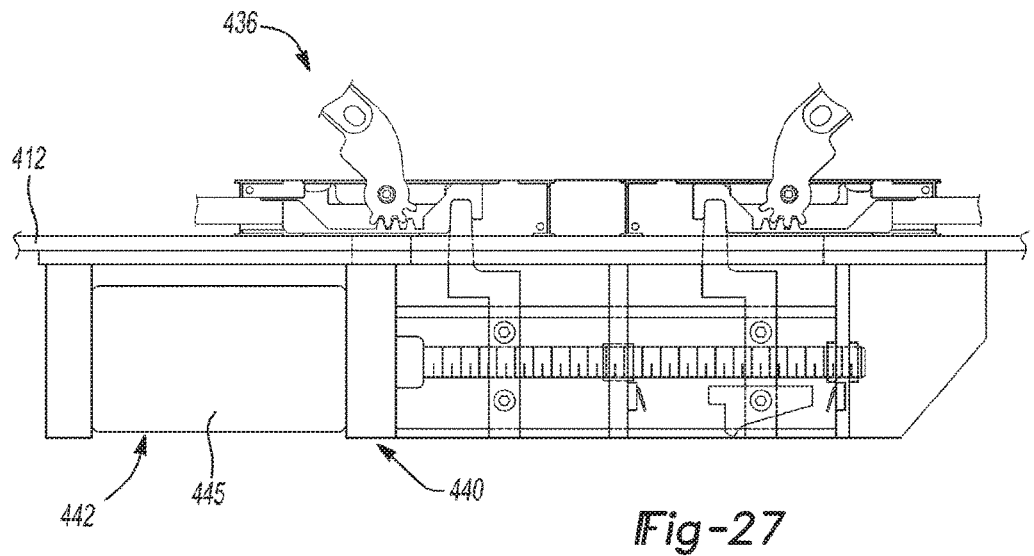
FIG. 27 shows a top perspective view of an alternate powered actuator assembly according to the principles of the present disclosure with the cover removed.
Figure 28:
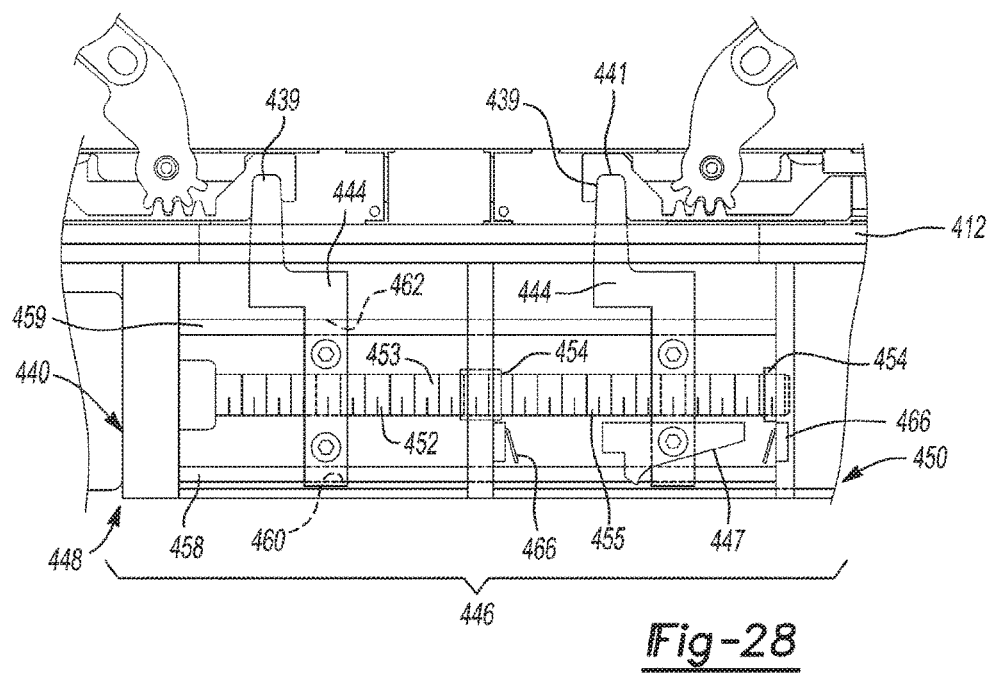
FIG. 28 shows an enlarged view of a portion of the powered actuator assembly of FIG. 27.

Referring now to FIGS. 27 and 28, an alternate powered actuator assembly according to the principles of the present disclosure is shown. FIGS. 27 and 28 show the powered actuator assembly 436 with its cover removed and mounted to a window frame 412. The powered actuator assembly 436 can be used to control the operation of multiple drive assemblies, such as, for example, one of the drive assemblies 221 and a mirror image of the drive assembly 221 that is incorporated into the vent operator assembly 18. As such, the powered actuator assembly 436 can control movement of the window vent 14 between (1) a closed and locked position; (2) a closed and unlocked position; (3) a partially open and unlocked position; and (4) a fully open and unlocked position as already described. FIGS. 27 and 28 show views of the powered actuator assembly 436 with its cover removed and mounted to a window frame 412.

As seen in FIG. 27, and similar to the powered actuator assembly 336 shown in FIG. 26, the powered actuator assembly 436 includes a frame 440 to which is mounted a motor/drive mechanism 442. The motor/drive mechanism 442 controls the linear movement of dual actuators 444, which can, via the actuator tabs 439, engage the slots or notches 441 of the drive members 22, 24, 122, 224 of the drive assemblies 20, 21, 120, 221. Linear movement of the actuator 444, in turn, moves the drive members 22, 24, 122, 224 in the channel 38, 238 to unlock, open, close and lock the window vent 14, as previously discussed. It should be understood that, as previously described with respect to the actuator assemblies 36, 336 there is flexibility in locating the powered actuator assembly 436 depending on a particular configuration of the vent operator assembly.

Referring to FIG. 28, the motor/drive mechanism 442 can include a motor 445 and a lead screw assembly 446. The motor 445 is mounted at a first end portion 448 of the frame 440. The lead screw assembly 446 extends between the first end portion 448 of the frame 440 and a second end portion 450 of the frame 440. Any of a variety of commercially available DC motors are well-suited for use in the motor/drive mechanism 442. A power cable provides power to the motor 445. As best shown in FIG. 28, limit switches 466 can be provided at locations on the opposite sides of an actuator bracket 447 to provide stop limits for the travel of the actuators 444. As is known, when the limit switches 466 are engaged, power to the motor 445 can be interrupted to prevent the actuators 444 from further advancing in a direction of travel. In the device shown in FIGS. 27 and 28, when engaged the limit switches have the effect of preventing both actuators 444 from further advancing in a direction of travel.

The lead screw assembly 446 includes a male-threaded screw member 452 that is rotationally driven by the motor 445. The screw member 452 is coupled to the motor 445 at a first end and is mounted to the frame 440 via one or more bearings 454 that enable the motor 445 to rotationally drive the screw member 452 relative to the frame 440. The screw member 452 includes a first portion 453 having a male thread of a first hand (i.e., right or left handed threads), and a second portion 455 having a male thread of a second hand that is the opposite hand of the first portion (i.e., left or right handed threads).

The dual actuators 444 each include a body portion 456 having a female-threaded aperture 458 which correspondingly engages a respective one of the opposite-hand threaded first portion 453 and second portion 455 of the screw member 452. As configured, rotation of the screw member 452 in first and second directions can cause corresponding back and forth linear movement of each of the actuators 444 in opposite directions relative to one another between respective first and second positions 448, 449, 450, 451 of the frame. The linear movement of the actuators 444 can be aligned with and/or guided by guide members 458, 459 that can be included in the frame 440. To this end, each of the actuators 444 each can include one or more of a slot 460 and/or an aperture 462 that can receive the guide members 458, 459.

The powered actuator assembly 436 can further include a control as previously discussed for remote actuation and monitoring of the vent operator.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An operator assembly for moving a window vent relative to a window frame, the operator assembly comprising:
   a stationary member adapted to be fixed to the window frame, the stationary member defining a channel;
   an arm mounted for rotation relative to the stationary member between an open position and a closed position; and
   a drive member received in the channel for linear motion therein relative to the stationary member and the arm among a first position in which the drive member engages a locking feature of the window vent with the arm in the closed position, a second position in which the drive member is spaced apart from and disengaged from the locking feature without rotating the arm out of the closed position, and a third position in which the drive member is further spaced apart from the locking feature, wherein movement of the drive member from the second position to the third position moves the arm from the closed position to the open position;
   wherein the drive member comprises a plurality of first gear teeth that engage a plurality of second gear teeth extending from the arm to drive the arm between the open and closed positions and a tab that is received within a slot in the arm when the drive member is in the first position to restrict rotation of the arm toward the open position.

2. The operator assembly of claim 1, further comprising an actuator assembly including a handle, wherein rotation of the handle between a first rotational position and a second rotational position causes corresponding movement of the drive member between the first position and the second position, and wherein rotation of the handle between the second rotational position and a third rotational position causes corresponding movement of the drive member between the second position and the third position.

3. The operator assembly of claim 1, wherein the tab is at least partially removed from the slot in the second position.

4. The operator assembly of claim 1, wherein the plurality of first gear teeth are shaped substantially identically to each other and are arranged in a linear pattern, and wherein the plurality of second gear teeth are shaped substantially identically to each other and are arranged in a curved pattern extending about a rotational axis of the arm.

5. The operator assembly of claim 1, further comprising a powered actuator assembly operable to move the drive member between the first position, second position, and third position.

6. The operator assembly according to claim 5, wherein the powered actuator assembly comprises a motor, a lead screw assembly and an actuator;
   wherein the motor and the lead screw assembly control movement of the actuator and the movement of the drive member between the first position, second position, and third position.

7. The operator assembly of claim 1, further comprising a drive assembly;
   wherein the drive assembly comprises the arm, the drive member, and a torque-amplifying gear set.

8. The operator assembly of claim 1, wherein the plurality of first gear teeth comprise a rack gear having a plurality of substantially identical first rack teeth and a single second rack tooth that is one of taller and wider than one of the first rack teeth; and
   wherein the plurality of second gear teeth are meshable with the first rack teeth.

9. An operator assembly for moving a window vent relative to a window frame, the operator assembly comprising:
   a stationary member adapted to be fixed to the window frame, the stationary member defining a channel;
   an arm mounted for rotation relative to the stationary member between an open position and a closed position; and
   a drive member received in the channel for linear motion therein relative to the stationary member and the arm among a first position in which the drive member engages a locking feature of the window vent with the arm in the closed position, a second position in which the drive member is spaced apart from and disengaged from the locking feature without rotating the arm out of the closed position, and a third position in which the drive member is further spaced apart from the locking feature, wherein movement of the drive member from the second position to the third position moves the arm from the closed position to the open position;
   wherein the drive member includes a first slot having a horizontally extending portion and a vertically extending portion that are angled relative to each other, and wherein the arm includes a peg that is slidably received in the first slot;
   wherein the stationary member includes an inclined second slot that is angled relative to the horizontally extending portion and the vertically extending portion of the first slot, and wherein the peg is slidably received within the second slot.

10. The operator assembly of claim 9, wherein movement of the drive member between the second and third positions causes the peg to move along the vertically extending portion of the first slot and along the inclined second slot, thereby causing the arm to rotate between the open and closed positions.

11. An operator assembly for moving a window vent relative to a window frame, the operator assembly comprising:
   a stationary member adapted to be fixed to the window frame, the stationary member defining a channel;
   an arm mounted for rotation relative to the stationary member between an open position and a closed position; and
   a drive member received in the channel for linear motion therein relative to the stationary member and the arm among a first position in which the drive member engages a locking feature of the window vent with the arm in the closed position, a second position in which the drive member is spaced apart from and disengaged from the locking feature without rotating the arm out of the closed position, and a third position in which the drive member is further spaced apart from the locking feature, wherein movement of the drive member from the second position to the third position moves the arm from the closed position to the open position;
   a drive assembly comprising the arm, the drive member, and a torque-amplifying gear set; and
   wherein the torque-amplifying gear set comprises a toothed rack on the drive member, a drive gear, a reduction gear, and gear teeth disposed on the arm.

12. The operator assembly of claim 11, wherein the drive gear and the reduction gear are integrally formed as a pinion gear that is rotatably mounted to the stationary member.

13. The operator assembly according to claim 11, wherein the actuator assembly comprises a powered actuator assembly to control operation of the operator assembly and movement of the window vent between a closed and locked position, a closed and unlocked position, and an open and unlocked position.

14. The operator assembly according to claim 13, wherein the powered actuator assembly comprises a motor, a lead screw assembly and an actuator;
   wherein the motor and the lead screw assembly control movement of the actuator and the linear movement of the drive member.

15. A vent operator assembly comprising:
   a base defining a channel extending along a longitudinal axis;
   at least one drive assembly; and
   an actuator assembly configured to operate the at least one drive assembly;
   wherein the at least one drive assembly comprises an arm rotatably mounted relative to the base, a drive member, and a torque-amplifying gear set;
   wherein the drive member is received in the channel and is linearly moveable relative to the base along the longitudinal axis between a closed position and an opened position;
   wherein the arm extends generally parallel to the longitudinal axis when the drive member is in the closed position, and generally transverse to the longitudinal axis when the drive member is in the opened position;
   wherein the arm comprises a slot and the drive member comprises a tab; and
   wherein in the closed position the tab is received in the slot to cinch the arm in the closed position.

16. The vent operator assembly according to claim 15, wherein the torque-amplifying gear set comprises a toothed rack on the drive member, a drive gear, a reduction gear, and gear teeth disposed on the arm.

17. The vent operator assembly according to claim 16, wherein the drive gear and the reduction gear are integrally formed as a pinion gear that is rotatably mounted to the base.

18. The vent operator assembly according to claim 15, wherein the actuator assembly comprises a powered actuator assembly to control operation of the operator assembly and movement of the window vent between a closed and locked position, a closed and unlocked position, and an open and unlocked position.

19. The vent operator assembly according to claim 18, wherein the powered actuator assembly comprises a motor, a lead screw assembly and an actuator;
   wherein the motor and the lead screw assembly control movement of the actuator and the linear movement of the drive member.

* * * * *